US011072412B2

(12) United States Patent
Jang et al.

(10) Patent No.: US 11,072,412 B2
(45) Date of Patent: Jul. 27, 2021

(54) MOUNTING MEMBER WITH ANTI-ROTATION BUSHINGS

(71) Applicant: The Boeing Company, Chicago, IL (US)

(72) Inventors: Su-Youn Jang, Fullerton, CA (US); Chunlei Liu, Chicago, IL (US); Jeff S. Siegmeth, Chicago, IL (US); Joshua P. Baker, Chicago, IL (US); William N. Borjeson, Chicago, IL (US); Marius Constantinescu, Chicago, IL (US)

(73) Assignee: The Boeing Company, Chicago, IL (US)

( * ) Notice: Subject to any disclaimer, the term of this patent is extended or adjusted under 35 U.S.C. 154(b) by 853 days.

(21) Appl. No.: 15/811,309

(22) Filed: Nov. 13, 2017

(65) Prior Publication Data
US 2018/0079481 A1 Mar. 22, 2018

Related U.S. Application Data

(63) Continuation-in-part of application No. 14/289,466, filed on May 28, 2014, now Pat. No. 9,815,544.

(51) Int. Cl.
*B64C 1/18* (2006.01)

(52) U.S. Cl.
CPC ..................... *B64C 1/18* (2013.01)

(58) Field of Classification Search
CPC ............ B60R 16/0215; B60R 16/0222; F16B 5/0258; F16L 5/10; H01B 17/58;
(Continued)

(56) References Cited

U.S. PATENT DOCUMENTS 2,971,425 A * 2/1961 Blakeley ............... B25B 31/005
411/28
3,357,730 A * 12/1967 Siler ..................... F16B 5/0225
403/408.1
(Continued)

OTHER PUBLICATIONS

VTE Power Bushings. www.vte-europe.com/downloads/catalog/VTE-22-Power-Bushings-2.pdf, Nov. 13, 2017.
(Continued)

*Primary Examiner* — Philip J Bonzell
(74) *Attorney, Agent, or Firm* — Perman & Green LLP

(57) ABSTRACT

A mounting member for a vehicle, the mounting member including a mounting member body having a longitudinal axis, at least one static opening extending through the body transverse to the longitudinal axis, and at least one blind listener bushing, each blind fastener bushing having a bushing body and a blind fastener receptacle extending axially through the bushing body. The bushing body has a bushing cross-sectional shape that interlocks and couples with a static opening cross-sectional shape of a respective one of the at least one static opening so that rotation of the at least one blind fastener bushing is constrained relative to the mounting member body and the static opening cross-sectional shape is maintained upon application of a blind fastener installation torque or blind fastener removal torque being applied to the blind fastener receptacle by a respective blind fastener.

20 Claims, 16 Drawing Sheets

(58) Field of Classification Search
CPC .. H02G 3/083; B64C 1/20; B64C 1/18; B64D 9/00; B64D 9/003
See application file for complete search history.

(56) References Cited

U.S. PATENT DOCUMENTS

| | | | | |
|---|---|---|---|---|
| 3,675,881 A * | 7/1972 | Caldwell | ............... | F16F 1/3732 267/141.4 |
| 3,899,092 A | 8/1975 | Nordstrom | | |
| 3,906,870 A | 9/1975 | Alberti | | |
| 4,457,649 A | 7/1984 | Vogg et al. | | |
| 4,895,471 A * | 1/1990 | Geltz et al. | ............... | F16B 7/14 211/105.3 |
| 5,234,297 A | 8/1993 | Wieck et al. | | |
| 5,387,047 A | 2/1995 | Korpi | | |
| 5,876,024 A * | 3/1999 | Hain | ............... | B64C 1/18 244/119 |
| 6,330,995 B1 * | 12/2001 | Mangeiga | ............... | B64D 27/26 244/54 |
| 6,347,905 B1 | 2/2002 | Lukschandel | | |
| 6,868,757 B2 * | 3/2005 | Hufnagl | ............... | B25B 23/1415 411/38 |
| 7,308,842 B2 * | 12/2007 | Hufnagl | ............... | B25B 23/1415 411/43 |
| 7,624,491 B2 * | 12/2009 | Polus | ............... | B29C 37/005 29/464 |
| 8,888,425 B2 * | 11/2014 | Pratt | ............... | F16B 19/1045 411/34 |
| 2004/0231467 A1 * | 11/2004 | Hufnagl | ............... | F16B 23/0061 81/55 |
| 2005/0123373 A1 * | 6/2005 | Hufnagl | ............... | F16B 31/021 411/43 |
| 2006/0088398 A1 | 4/2006 | Lund | | |
| 2010/0051397 A1 * | 3/2010 | Kim | ............... | F16D 65/12 188/218 XL |
| 2014/0064827 A1 | 3/2014 | Korenromp et al. | | |
| 2017/0045080 A1 | 2/2017 | Grether et al. | | |

OTHER PUBLICATIONS

INA Walzlager Schaeer oHG. "Polygon Bearings: Reducing Resonant Vibration in Automotive Differentials", Automotive Product Information API 11, 2000.
Gobal Industrial Bushings. www.globalindustrial.com/c/motors/pulleys-sheaves/bushings, Oct. 26, 2017.
CarrLane Manufacturing Co. Template Bushings. www.carrlane.com/en-us/product/drill-jig-bushings/template-bushings, Oct. 26, 2017.

* cited by examiner

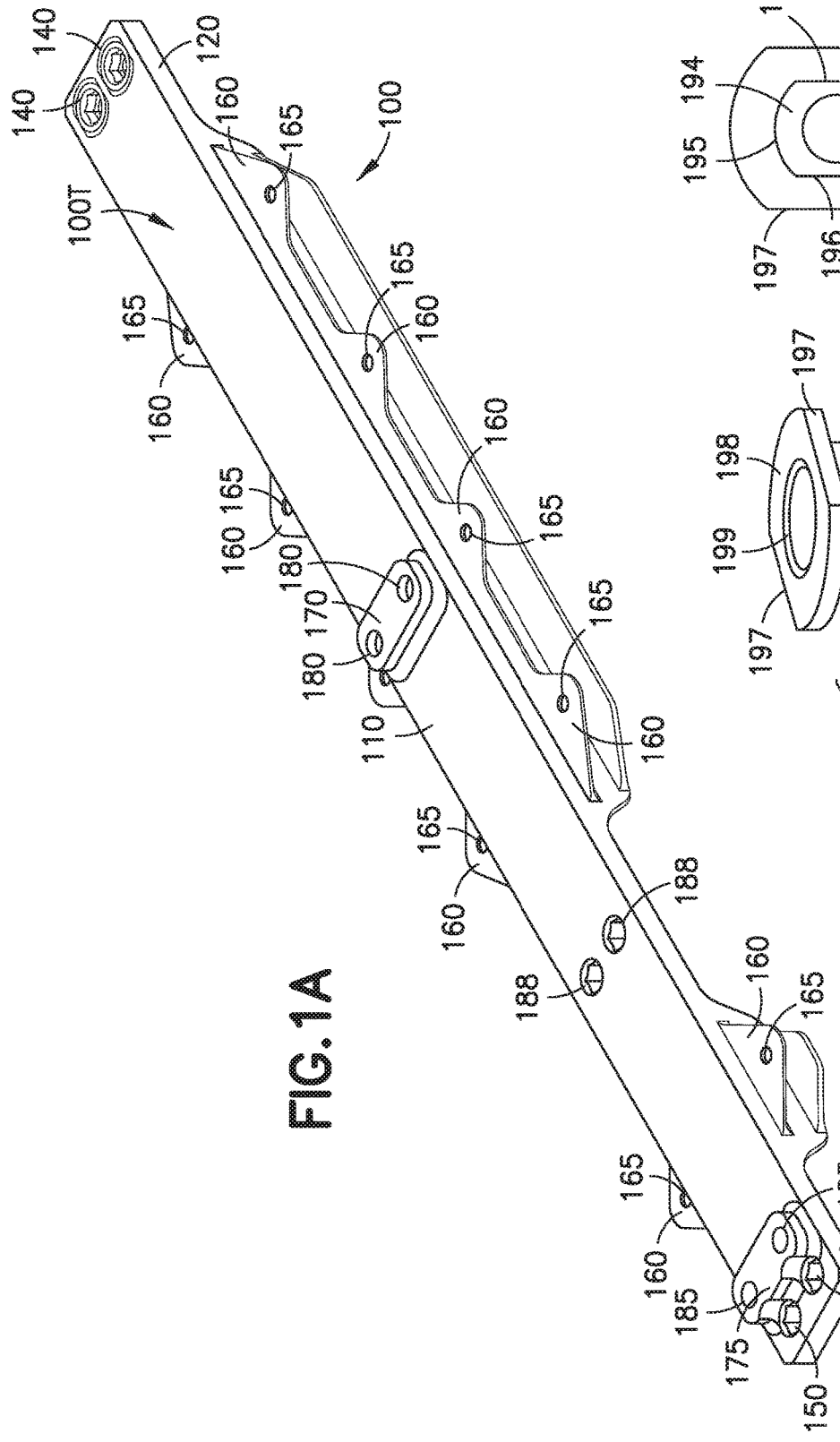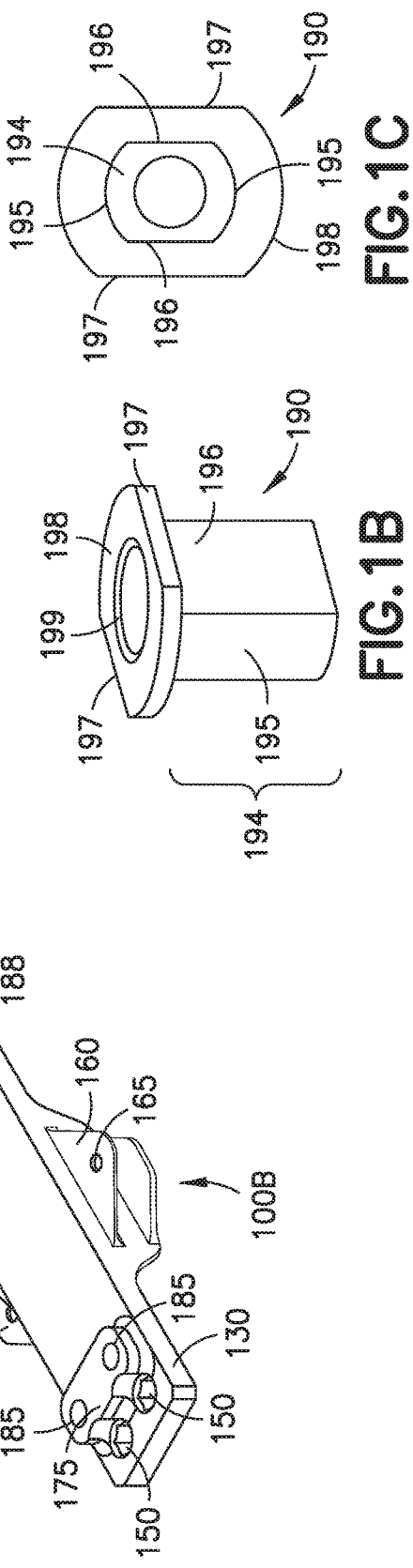

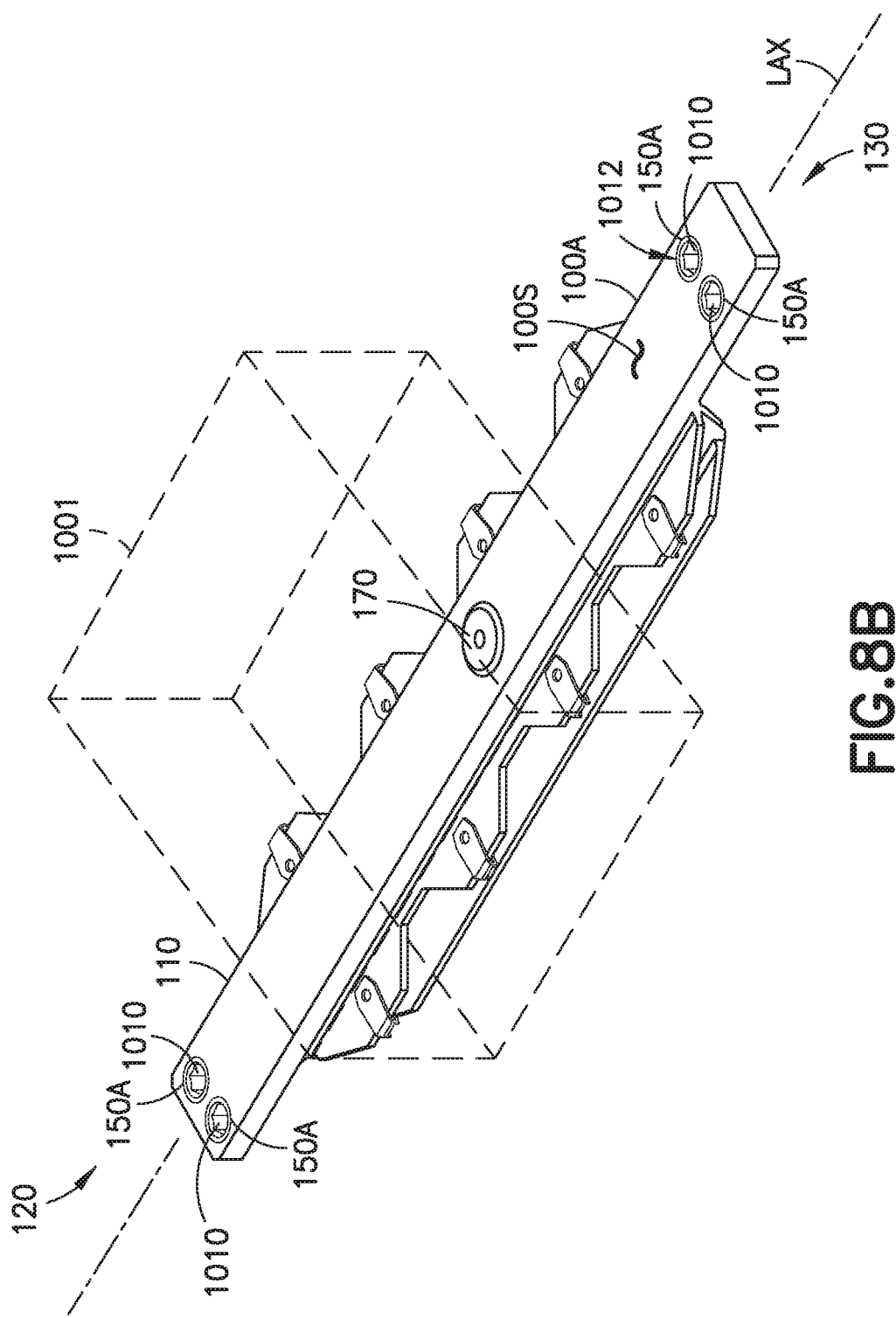

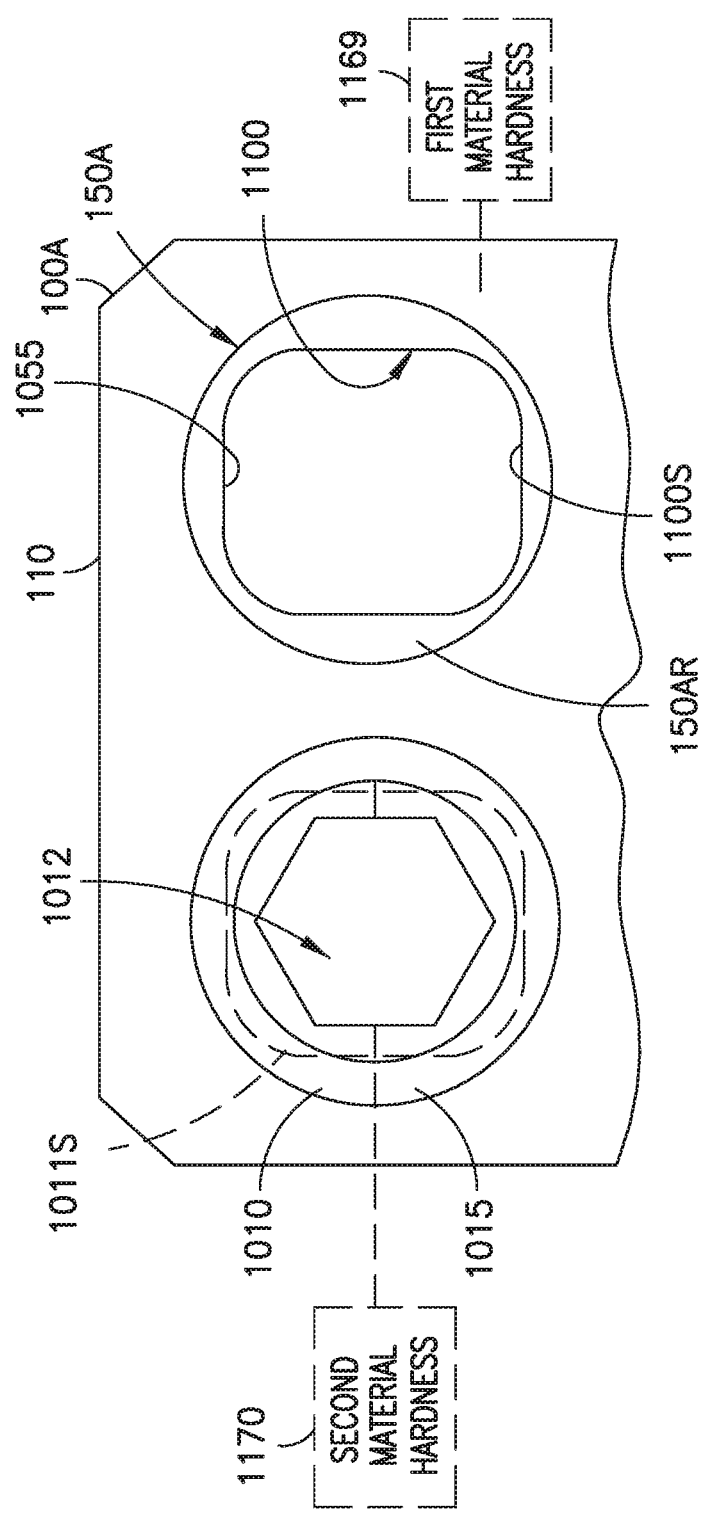
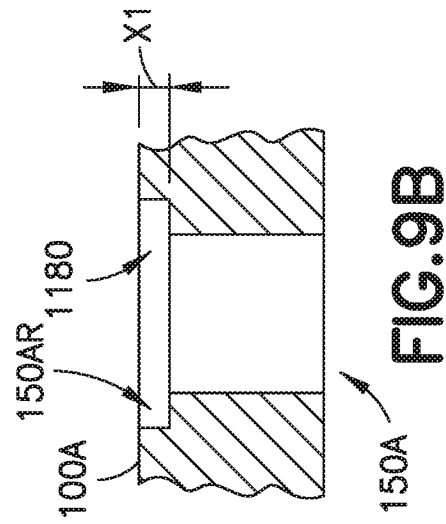

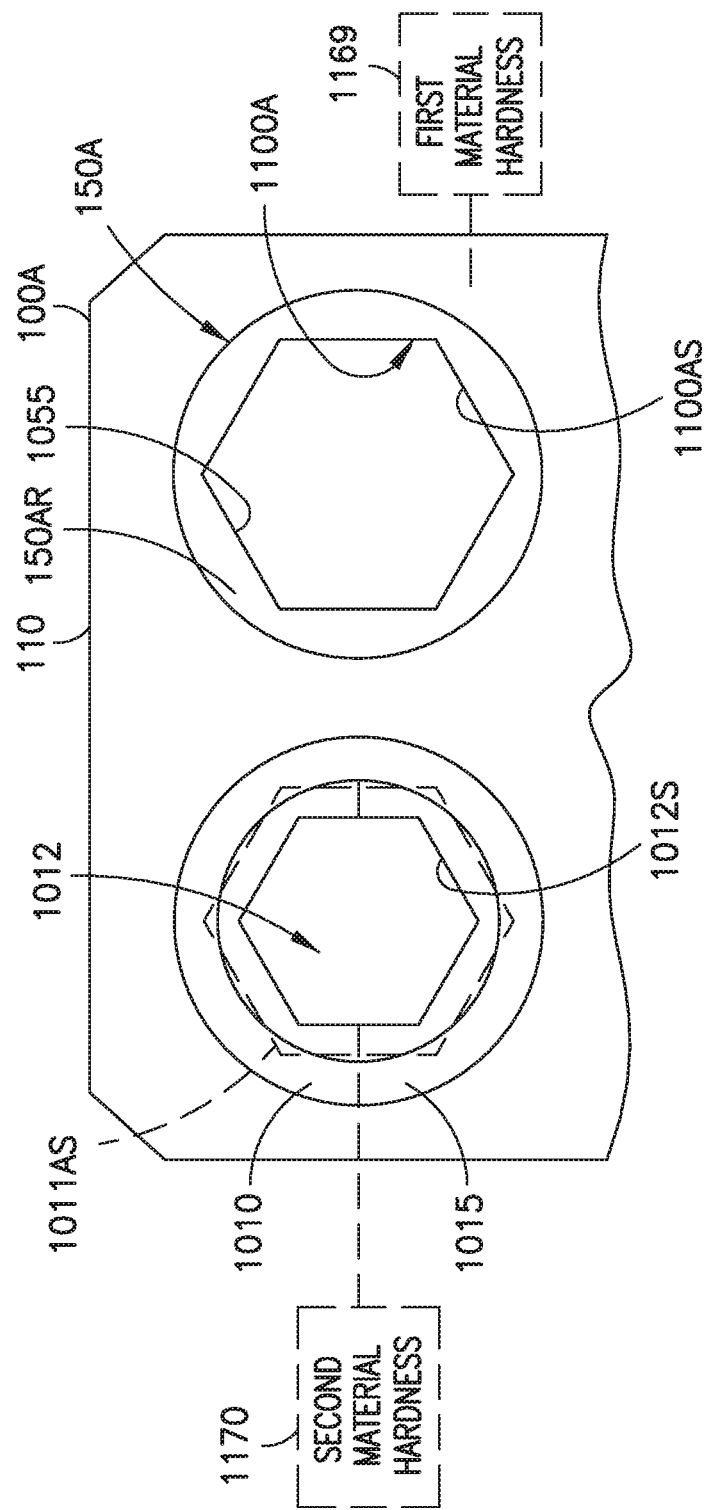

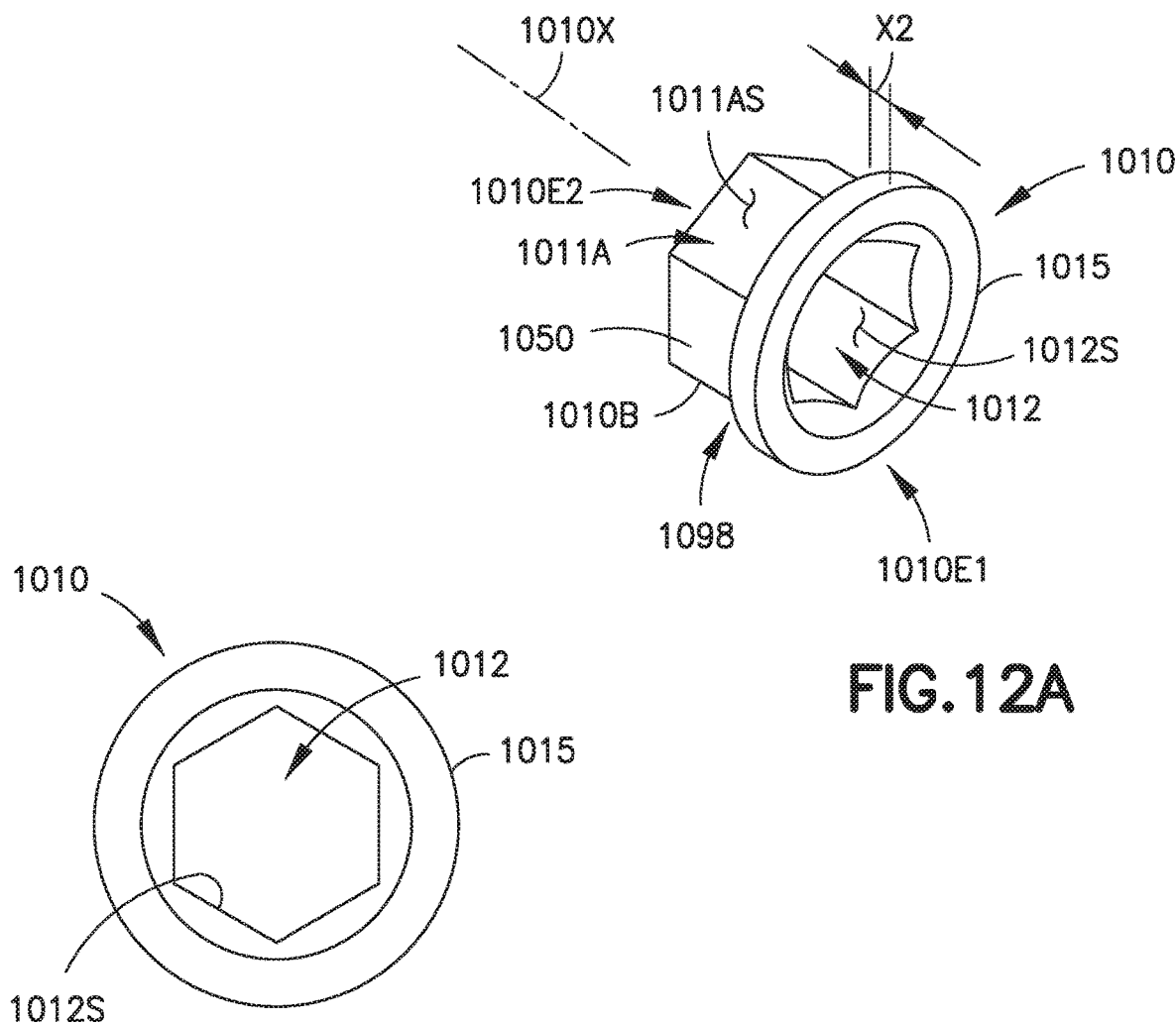
FIG.12A
FIG.12B
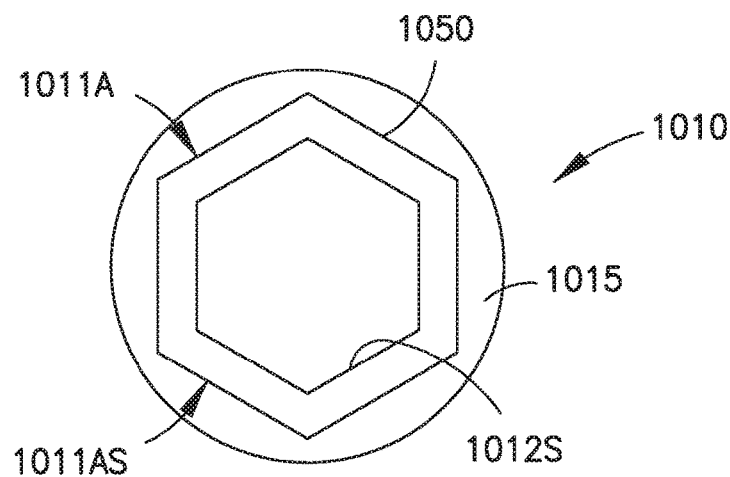
FIG.12C

MOUNTING MEMBER WITH ANTI-ROTATION BUSHINGS

CROSS-REFERENCE TO RELATED APPLICATIONS

This application is a continuation-in-part of and claims the benefit of U.S. Non-Provisional patent application Ser. No. 14/289,466 filed on May 28, 2014 (now U.S. Pat. No. 9,815,544), the disclosure of which is incorporated by reference herein in its entirety.

BACKGROUND

1. Field

The present disclosure relates to mounting members for vehicles. In particular, it relates to mounting members having blind-fastener anti-rotation bushings.

2. Brief Description of Related Developments

Currently, intercostals are routinely installed under the cabin floor of an aircraft. Intercostals are used to divert forces for the floor structure, to secure floor panels, as well as to provide attachment points for payloads (e.g., seats) and/or monuments (e.g., class dividing walls). Conventional intercostals typically employ rigid attachments. However, installation of conventional intercostals is not possible in the wing area of an aircraft fuselage or other areas of an aircraft that experience large amounts of deflection. This is because installation of conventional intercostals in such areas can cause less than optimal structural load paths and/or fatigue stress issues.

In addition, it should be noted that conventional intercostals are typically attached to longitudinal beams that lie under the cabin floor and run perpendicular to the floor panels. This configuration makes the intercostals difficult to install and remove because this area is small to work in and it is, in many cases, difficult or impossible to fit the necessary tools for installation/removal without temporarily removing local systems, adjacent floor panels, and structures mounted above the floor panels. As such, there is a need for an intercostal that can be installed in the wing area of an aircraft, and which may be easily installed and removed from that location.

In addition, the intercostals and other mounting members in vehicles such as aircraft are generally installed using top-down or blind fasteners. Conventional mounting members, such as those used to mount floor panels and vehicle monuments are machined to include apertures that directly engage the fasteners. However, in a quest to decrease cost and reduce weight of vehicles, materials used to build the vehicles change. In this aspect, the mounting members may not have the material strength to resist the installation or de-installation torques applied to the blind fasteners which may lead to difficulties when installing the blind fasteners.

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

The present disclosure relates to a method, system, and apparatus for a modular replaceable slip joint intercostal. In one or more examples, an intercostal apparatus for a vehicle comprises a body, where the body is greater in length than in width. In at least one example, the intercostal apparatus further comprises at least one slip joint opening located proximate a first end of the body to slidably receive a bushing and a first fastener, where the bushing rigidly attaches to a top surface of a first seat track by the first fastener.

In one or more examples, the intercostal apparatus further comprises at least one static opening located proximate a second end of the body, which is opposite the first end of the body, to receive a second fastener to rigidly attach the apparatus to a top surface of a second seat track, which is substantially parallel to the first seat track. In at least one example, the body comprises at least one flange having a top surface and a bottom surface. The flange(s) extending substantially horizontally from a longitudinal side of the body such that a top surface of the flange(s) is substantially coplanar with the top surface of the first seat track and the top surface of the second seat track. The flange(s) comprises at least one opening to receive a floor panel connector.

In at least one example, the apparatus further comprises at least one monument interface on a top surface of the body of the apparatus. In one or more examples, at least one monument interface is used to mount furniture, a class divider wall, a galley, and/or equipment. In some examples, at least one monument interface is a crown-type seat track mounting.

In one or more examples, the apparatus is installed in an over-wing area of the vehicle.

In at least one example, a top surface of the body is multi-planar, such that a top surface of a center section of the body, located between the first end of the body and a second end of the body, is lower than a top surface of the first end of the body and a top surface of a second end of the body, which are substantially co-planar, and where the second end of the body is opposite the first end of the body. In some examples, the center section of the body is a single part, the first end of the body is a single part, and the second end of the body is a single part; and the center section, the first end, and the second end are mechanically fastened together to form the intercostal apparatus.

In one or more examples, at least a portion of the bushing is substantially cylindrical in shape. In at least one example, a top edge of the bushing comprises a flange. In some examples, an underside of the flange of the bushing is in contact with an inner ledge of the slip joint(s), when the slip joint(s) receives the bushing. In one or more examples, the underside of the flange of the bushing is coated with a material to reduce friction. In some examples, the inner ledge of at least one slip joint is coated with a material to reduce friction.

In at least one example, at least a portion of an exterior surface of the bushing is coated with a material (e.g., a polymer) to reduce friction. In some examples, at least a portion of an interior surface of at least one slip joint is coated with a material (e.g., a polymer) to reduce friction.

In one or more examples, a method for installing an intercostal in a vehicle, the method comprises providing, for at least one slip joint opening located proximate a first end of a body of the intercostal, a bushing and a first fastener. In at least one example, an underside of a flange of the bushing is in contact with an inner ledge of at least one slip joint opening. The method further comprises rigidly attaching, by the first fastener, the bushing to a top surface of a first seat track.

In at least one example, the method further comprises providing, for at least one static opening located proximate a second end of the body, a second fastener. In one or more examples, the first end of the body is opposite the second end of the body. The method further comprises rigidly attaching, by the second fastener, the intercostal to a top surface of a second seat track, which is substantially parallel to the first seat track.

In one or more examples, the method further comprises providing, for at least one opening of at least one flange extending substantially horizontally from a longitudinal side of the body such that a top surface of at least one flange is substantially coplanar with the top surface of the first seat track and the top surface of the second seat track, a floor panel connector. The method further comprises rigidly attaching, with the floor panel connector, the intercostal to a bottom surface of a floor panel.

In at least one example, a system for an intercostal for a vehicle comprises at least one fastener, at least one bushing, and an intercostal. In one or more examples, the intercostal comprises a body, where the body is greater in length than in width. In one or more examples, the intercostal further comprises at least one slip joint opening located proximate an end of the body to slidably receive at least one bushing and at least one fastener, where at least one bushing rigidly attaches to a top surface of a seat track by at least one first fastener.

In at least another example, a mounting member for a vehicle, the mounting member comprises: a mounting-member body having a longitudinal axis; and at least one static opening extending through the mounting-member body transverse to the longitudinal axis; at least one blind-fastener bushing, each blind-fastener bushing having a bushing body and a blind-fastener receptacle extending axially through the bushing body; wherein the bushing body has a bushing-body cross-sectional shape that interlocks and couples with a static-opening cross-sectional shape of a respective one of the at least one static opening so that rotation of the at least one blind-fastener bushing is constrained relative to the mounting-member body and the static-opening cross-sectional shape is maintained upon a blind-fastener installation torque or a blind-fastener removal torque being applied to the blind-fastener receptacle by a respective blind fastener.

In one or more examples, the at least one blind-fastener bushing has a first material hardness that is greater than a second material hardness of the mounting-member body.

In one or more examples, the mounting-member body comprises aluminum and the at least one blind-fastener bushing comprises titanium.

In one or more examples, the bushing body includes an outer peripheral surface that circumscribes the blind-fastener receptacle, the outer peripheral surface having at least one surface portion forming one or more of a substantially flat surface portion, a concave surface portion, and a convex surface portion; and the respective one of the at least one static opening having an inner peripheral surface that is complementary to the outer peripheral surface so that the rotation of the at least one blind-fastener bushing is constrained relative to the mounting-member body and the static-opening cross-sectional shape is maintained upon the blind-fastener installation torque or the blind-fastener removal torque being applied to the blind-fastener receptacle by the respective blind fastener.

In one or more examples, the one or more of a substantially flat surface portion, a concave surface portion, and a convex surface portion of the outer peripheral surface, and the inner peripheral surface, having one or more of a surface area or a surface profile that substantially prevents deformation of the at least one static opening by the at least one blind-fastener bushing upon the blind-fastener installation torque or the blind-fastener removal torque being applied to the blind-fastener receptacle by the respective blind fastener.

In one or more examples, the at least one blind-fastener bushing includes a flange that radially extends from the bushing body so as to extend past an interface between the respective one of the at least one static opening and the outer peripheral surface.

In one or more examples, the outer peripheral surface has a substantially rectangular cross-section.

In one or more examples, the outer peripheral surface has a substantially hexagonal cross-section.

In one or more examples, the outer peripheral surface has a substantially ovoid cross-section.

In one or more examples, the outer peripheral surface has a multifaceted cross-section.

In one or more examples, each blind-fastener bushing includes a flange that radially extends from the bushing body, adjacent a first end of the bushing body, so as to form a shoulder with an outer peripheral surface of the bushing body.

In one or more examples, each blind-fastener bushing attaches to a frame of the vehicle with the respective blind fastener extending through the blind-fastener receptacle; and the flange couples with the mounting-member body so that the shoulder retains the mounting-member body substantially against the frame of the vehicle.

In one or more examples, the blind-fastener receptacle has an inner peripheral surface configured to engage at least a portion of the respective blind fastener so as to substantially prevent rotation of the portion of the blind fastener relative to the bushing body.

In at least another example, a mounting member for a vehicle, the mounting member comprises: a mounting-member body having a first end and a second end, the second end being longitudinally spaced from the first end; at least one static opening, extending through the mounting-member body, adjacent each of the first end and the second end; a bushing configured for insertion into a respective one of the at least one static opening, the bushing including a bushing body, an aperture extending axially through the bushing body where the bushing body forms an outer peripheral surface that circumscribes the aperture; and wherein the respective one of the at least one static opening has an inner peripheral surface that is complementary to and interlocks with the outer peripheral surface so that the bushing is rotationally fixed relative to the mounting-member body.

In one or more examples, the inner peripheral surface is complementary to and interlocks with the outer peripheral surface so that a static-opening cross-sectional shape is maintained upon application of a fastener installation torque or a fastener removal torque to the bushing.

In one or more examples, the bushing has a first material hardness that is greater than a second material hardness of the mounting-member body.

In one or more examples, the mounting-member body comprises aluminum and the bushing comprises titanium.

In one or more examples, the outer peripheral surface having at least one surface portion that forms one or more of a substantially flat surface portion, a concave surface portion, and a convex surface portion; and the respective one of the at least one static opening having an inner peripheral surface that is complementary to the one or more of the substantially flat surface portion, the concave surface portion, and the convex surface portion of the outer peripheral surface.

In one or more examples, the one or more of the substantially flat surface portion, the concave surface portion, and the convex surface portion of the outer peripheral surface, and the inner peripheral surface, having one or more of a surface area or a surface profile that substantially prevents deformation of the respective one of the at least one static opening by the bushing upon a fastener installation torque or a fastener removal torque being applied to the aperture by a respective fastener.

In one or more examples, the bushing includes a flange that radially extends from the bushing body so as to extend past an interface between the respective one of at least one static opening and the outer peripheral surface.

In one or more examples, the outer peripheral surface has a substantially rectangular cross-section.

In one or more examples, the outer peripheral surface has a substantially hexagonal cross-section.

In one or more examples, the outer peripheral surface has a substantially ovoid cross-section.

In one or more examples, the outer peripheral surface has a multifaceted cross-section.

In one or more examples, the bushing includes a flange that radially extends from the bushing body, adjacent a first end of the bushing body, so as to form a shoulder with the outer peripheral surface of the bushing body.

In one or more examples, the bushing attaches to a frame of the vehicle with a respective fastener extending through the aperture; and the flange couples with the mounting-member body so that the shoulder retains the mounting-member body substantially against the frame of the vehicle.

In one or more examples, the aperture has an inner peripheral surface configured to engage at least a portion of the respective fastener so as to substantially prevent rotation of the portion of the fastener relative to the bushing body.

In at least another example, a method for installing a mounting member in a vehicle comprises: providing a mounting-member body with at least one static opening located adjacent each of a first end and a second end of the mounting-member body, wherein a bushing is inserted into at least one of the at least one static opening, and wherein the at least one static opening has an inner peripheral surface that is complementary to and interlocks with an outer peripheral surface of the bushing so that the bushing is rotationally fixed relative to the mounting-member body; and rigidly coupling the mounting-member body to a frame of the vehicle with a fastener extending through an aperture of the bushing.

In one or more examples, the mounting-member body is retained substantially against the frame by a flange of the bushing, wherein the flange radially extends from a bushing body of the bushing.

In one or more examples, the method further includes applying a fastener installation torque or a fastener removal torque to the aperture with the fastener, wherein one or more of a substantially flat surface portion, a concave surface portion, and a convex surface portion of the outer peripheral surface of the bushing and the inner peripheral surface of the at least one static opening have one or more of a surface area or surface profile that substantially prevents deformation of a respective one of the at least one static opening by the bushing.

The features, functions, and advantages can be achieved independently in various examples of the present disclosure or may be combined in yet other examples.

BRIEF DESCRIPTION OF THE DRAWINGS

These and other features, aspects, and advantages of the present disclosure will become better understood with regard to the following description, appended claims, and accompanying drawings, which are not necessarily drawn to scale, and wherein like reference characters designate the same or similar parts throughout the several views, and where:

FIG. 1A is a diagram of a first example of the disclosed modular replaceable slip joint intercostal, in accordance with at least one example of the present disclosure.

FIG. 1B is a diagram of an exemplary bushing to be employed by the modular replaceable slip joint intercostal of FIG. 1, in accordance with at least one example of the present disclosure.

FIG. 1C is a diagram showing the bottom view of the exemplary bushing of FIG. 1B, in accordance with at least one example of the present disclosure.

FIG. 8B is a diagram of a mounting member, in accordance with at least one example of the present disclosure.

FIG. 9A is a schematic illustration of a portion of the mounting member of FIG. 8A, in accordance with at least one example of the present disclosure.

FIG. 9B is a cross-sectional view of a portion of the mounting member illustrated in FIG. 9A, in accordance with at least one example of the present disclosure;

FIG. 11 is a schematic illustration of a portion of the mounting member of FIG. 8A, in accordance with at least one example of the present disclosure.

FIG. 12A is a perspective diagram of an exemplary bushing to be employed by the mounting member of FIG. 8A, in accordance with at least one example of the present disclosure.

FIG. 12B is a top view of the exemplary bushing of FIG. 12A, in accordance with at least one example of the present disclosure.

FIG. 12C is a bottom view of the exemplary bushing of FIG. 12A, in accordance with at with at least one example of the present disclosure.

DETAILED DESCRIPTION

Figure 2:
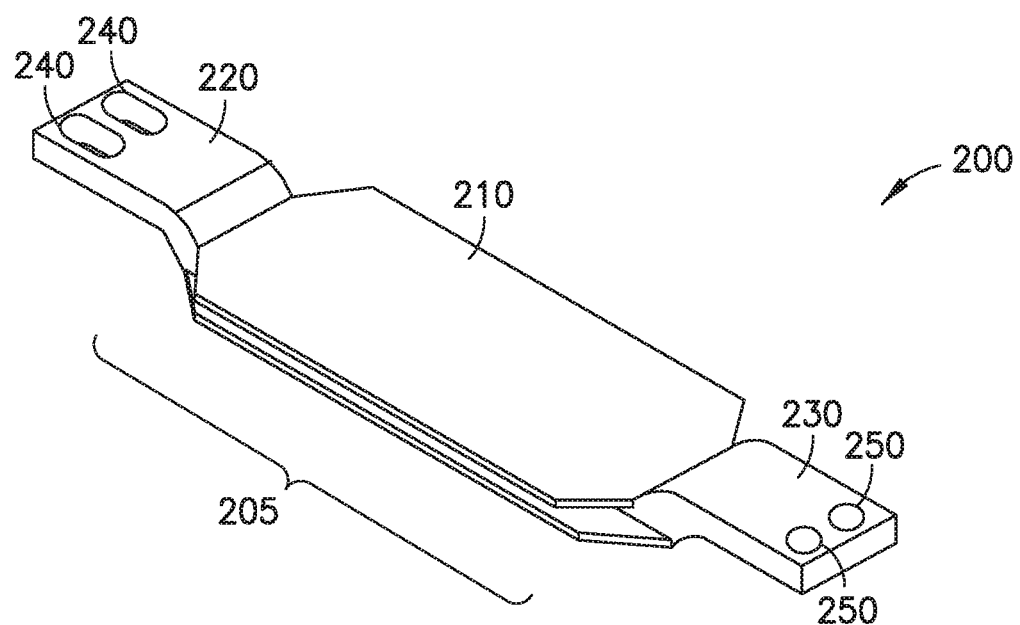
FIG. 2 is diagram of a second example of the disclosed modular replaceable slip joint intercostal, in accordance with at least one example of the present disclosure.

The methods and apparatus disclosed herein provide an operative system for a modular replaceable slip joint intercostal. The disclosed system provides an intercostal design that employs at least one slip joint proximate an end of the intercostal. The slip joint(s) included in the intercostal allows for a reduction in fatigue problems. The disclosed system also provides for the manufacture of mounting members, including intercostals, using a larger array of materials by isolating a body of the intercostal from the fasteners used to couple the intercostal to a frame of the vehicle. This may reduce the overall cost of the vehicle allowing for the use of less exotic materials.

As previously mentioned above, intercostals are currently routinely installed under the cabin floor of an aircraft. Intercostals are used to divert forces for the floor structure (e.g., floor beams and seat tracks), to secure floor panels, as well as to provide attachment points for payloads (e.g., seats, class dividing walls, galleys, and lavatories). Conventional intercostals may not be installed over the center wing box area of an aircraft due to fatigue stress problems associated with necessary flexing of the wing in this area.

The present disclosure provides a slip intercostal design with a unique slip joint that allows the intercostal to move in the axial direction to minimize constraint of the floor structure, which can lead to fatigue problems. The intercostal design additionally allows for the intercostal to be installed on top of an existing floor structure via a rigid fastener (e.g., an E-Nut®) fastened vertically downward.

In one or more examples, the intercostal design includes a drop-down mid-section such that the upper face of the intercostal is at the same level as the bottom surface of the floor. This feature allows for various well known interface mountings (e.g., a monument mounting, and a crown-type seat track mounting) to be incorporated onto the intercostal.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1A is a diagram of a first example of the disclosed modular replaceable slip joint intercostal 100, in accordance with at least one example of the present disclosure. In this figure, the intercostal 100 includes a body 110, a first end 120 of the body 110, and a second end 130 of the body 110. The second end 130 is located opposite the first end 120. The body 110 is shown to be greater in length than in width. Two slip joint openings (i.e. slip joints) 140 are shown to be located proximate the first end 120 of the body 110. The slip joint openings 140 are each able to slidably receive a bushing 190 (refer to FIG. 1B) and a fastener 1000 (such as a bolt or E-Nut®, see FIG. 8C). In one aspect, the fastener 1000 (FIG. 8C) is a top-down fastener that is installed from only one side (e.g., a top side 100T) of the intercostal 100 such that access to both the top side 100T and a bottom side 100B of the intercostal 100 is not needed to install the fastener 1000. It should be noted that the slip joint openings 140 each have a definite length such that if the airplane flexes a pre-defined amount, the intercostal 100 will reach the end of the slip joint opening 140 and take up the load. Also, it should be noted that the fastener 1000 (FIG. 8C) is simply a hardware device (e.g., a bolt or E-Nut®) that is able to mechanically join or affix two or more objects together. In addition, it should be noted that the interior surface of each of the slip joint openings 140 include an inner ledge (not shown) to receive the bushing 190. During installation of the intercostal 100, after the bushing 190 and the fastener are inserted into the slip joint opening 140, the bushing 190 rigidly attaches to a top surface of a seat track 410 (refer to FIG. 4A) of the cabin of a vehicle (e.g. an aircraft) by the fastener. The installation of the intercostal 100 will be further described in the description of FIGS. 4A and 5.

Referring back to FIG. 1A, the intercostal 100 is also shown to include two static openings 150 located proximate the second end 130 of the body 110. The static openings 150 are each able to receive a fastener (e.g., an E-Nut®). During installation of the intercostal 100, after the fastener is inserted into the static opening 150, the fastener rigidly attaches the intercostal 100 to a top surface of a seat track 420, which is substantially parallel to seat track 410 (refer to FIG. 4A).

Also in FIG. 1A, the body 110 of the intercostal 100 is shown to include flanges 160 each having a top surface and a bottom surface. The flanges 160 extend substantially horizontally from a longitudinal side of the body 110. Each of the flanges 160 are shown to comprise an opening 165 to receive a floor panel connector (e.g., a fastener), which is used to mount a floor panel to the top surface of the flange 160. After the intercostal 100 is installed, the top surface of each the flanges 160 is substantially coplanar with the top surface of the seat tracks 410, 420 (refer to FIG. 4A).

In FIG. 1A, the top surface of the body 110 of the intercostal 100 is also shown to include a monument interface 170. Additionally, the top surface of the second end 130 of the body 110 of the intercostal 100 includes a monument interface 175. The monument interfaces 170, 175 each include openings 180, 185 to receive fasteners, which are used to mount various different structures or payloads 1001 (FIGS. 8A and 8B) (e.g., furniture, a class divider wall, a galley, lavatory, skins, interior panels, floor panels, and/or any other suitable equipment or structures) to the monument interfaces 170, 175.

Also in this figure, two optional additional static openings 188 are shown on the body 110 of the intercostal 100. The static openings 188 are each able to receive a fastener 1000 (FIG. 8C) (e.g., an E-Nut®). During installation of the intercostal 100, after the fastener 1000 is inserted into the static opening 188, the fastener 1000 rigidly attaches the intercostal 100 to a top surface of a supporting track 430, which is substantially parallel to seat track 410 and to seat track 420 (refer to FIG. 4A).

FIG. 1B is a diagram of an exemplary bushing 190 to be employed by the modular replaceable slip joint intercostal 100 of FIG. 1, in accordance with at least one example of the present disclosure. FIG. 1C is a diagram showing the bottom view of the exemplary bushing 190 of FIG. 1B, in accordance with at least one example of the present disclosure. In these figures, two portions 195 of the body 194 of the bushing 190 are shown to be substantially cylindrical in shape. And, two other portions 196 of the body 194 of the bushing 190 are shown to have a flat surface, which is where the bushing 190 contacts the intercostal 100 and which allows for an easier application of a low friction material (e.g., a polymer) to provide for a low-friction slip joint 140. In addition, the bushing 190 is shown to include a flange 198 on one of its ends. The flange 198 is shown to have two portions 197 that have a flat surface. After the intercostal 100 is installed, the underside of the flange 198 is in contact with the inner ledge of the slip joint 140. The flange 198 serves primarily to retain the intercostal 100.

In one or more examples, the underside of the flange 198 of the bushing 190 is coated with a material (e.g., a polymer) to reduce friction. In at least one example, the inner ledge of the slip joint 140 is also coated with a material to reduce friction. In some examples, at least a portion of the exterior surface of the body 194 of the bushing 190 is coated with a material to reduce friction. In one or more examples, at least a portion of the interior surface of the slip joint 140 is coated with a material to reduce friction. In yet another example, the underside of the first end 120 and the second end 130 of the intercostal 100 is coated with a material to reduce friction. An example of a material that may be employed for the coating is Karon V, which is manufactured by Kaman Corp. However, it should be noted that other materials other than Karon V may be employed for the coating.

FIG. 2 is diagram of a second example of the disclosed modular replaceable slip joint intercostal 200, in accordance with at least one example of the present disclosure. In this figure, the intercostal 200 is shown to be multi-planar such that the top surface of the center section 205 of the body 210 is lower than the top surface of the first end 220 of the body 210 and the top surface of the second end 230 of the body 210. The top surface of the first end 220 of the body 210 and the top surface of the second end 230 of the body 210 are substantially co-planar and substantially co-planar with the top surface of an adjacent floor panel (not shown).

Also in this figure, the intercostal 200 is shown to include two slip joint openings (i.e. slip joints) 240 located proximate the first end 220 of the body 210. The slip joint openings 240 are each able to slidably receive a bushing 190 (refer to FIG. 1B) and a fastener 1000 (FIG. 8C). During installation of the intercostal 200, after the bushing 190 and the fastener 1000 are inserted into the slip joint opening 240, the bushing 190 rigidly attaches to a top surface of a seat track of the cabin of a vehicle (e.g. an aircraft) by the fastener 1000.

Also in FIG. 2, the intercostal 200 is shown to include two static openings 250 located proximate the second end 230 of the body 210. The static openings 250 are each able to receive a fastener 1000 (FIG. 8C) (e.g., an E-Nut®). During installation of the intercostal 200, after the fastener 1000 is inserted into the static opening 250, the fastener 1000 rigidly attaches the intercostal 200 to a top surface of a seat track.

In one or more examples, the intercostal 200 is modular such that the center section 205 of the body 210 is a single part (e.g., manufactured to be a single, separate unit), the first end 220 of the body 210 is a single part, and the second end 230 of the body 210 is a single part. And, the center section 205, the first end 220, and the second end 230 are mechanically fastened (e.g., via bolts, bonding, welding, etc.) together to form the intercostal 200.

Figure 3:
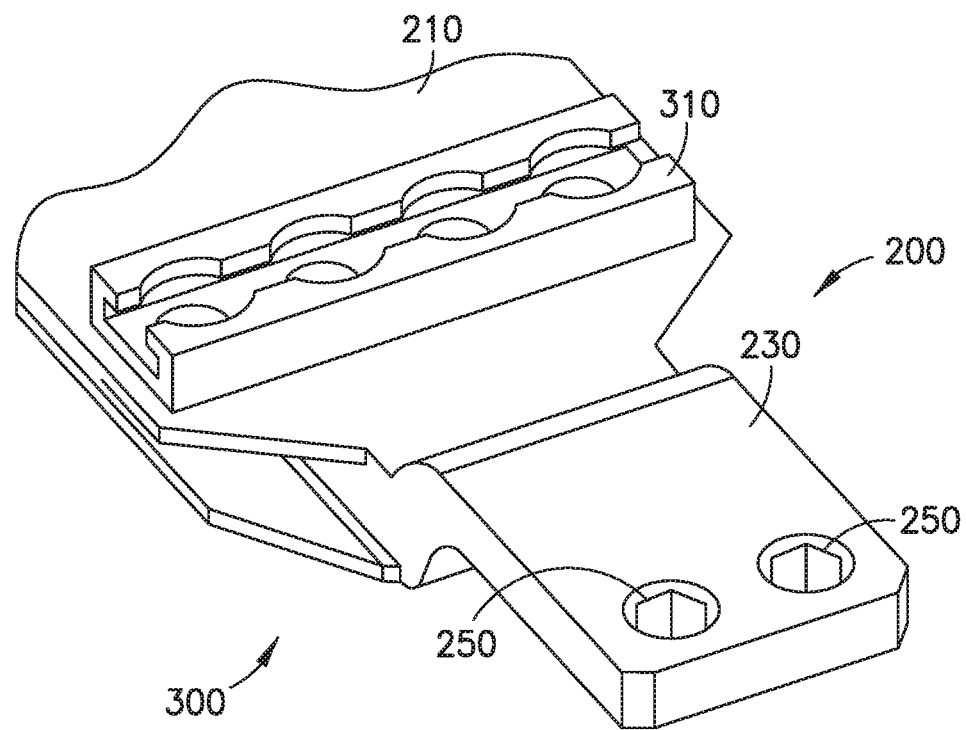
FIG. 3 is a diagram of a crown-type seat track mounting that may be employed by the modular replaceable slip joint intercostal of FIG. 1 and/or by the modular replaceable slip joint intercostal of FIG. 2, in accordance with at least one example of the present disclosure.

FIG. 3 is a diagram of a crown-type seat track mounting 310 that may be employed by the modular replaceable slip joint intercostal 100 of FIG. 1 and/or by the modular replaceable slip joint intercostal 200 of FIG. 2, in accordance with at least one example of the present disclosure. In this figure, the intercostal 200 of FIG. 2 is shown to include this crown-type seat track mounting 310 on its body 210. This particular mounting 310 is a traditional mounting that is commonly used to install seats in a cabin of an aircraft.

Figure 4A:
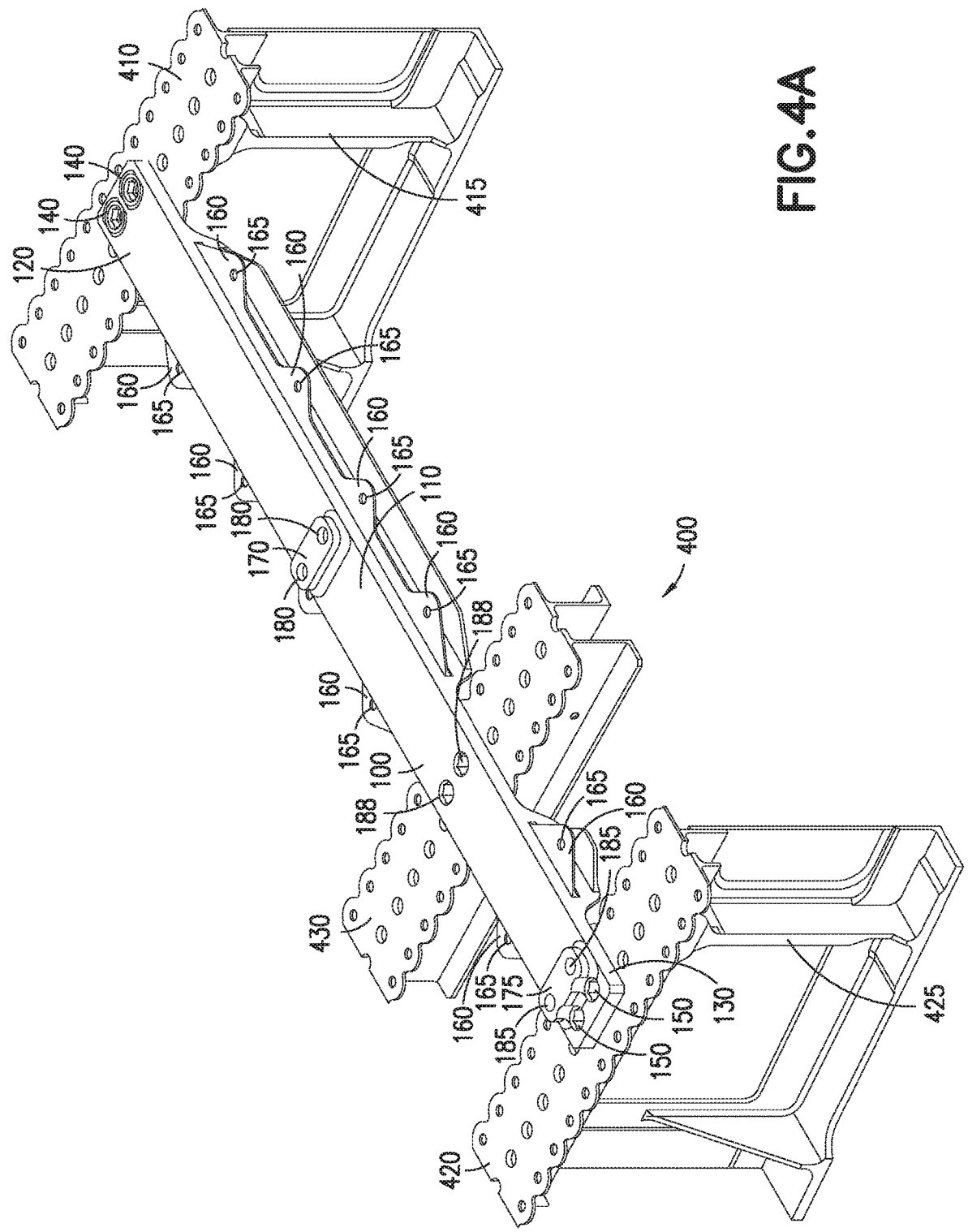
FIG. 4A is a diagram of the modular replaceable slip joint intercostal of FIG. 1 installed between two seat tracks of a vehicle, in accordance with at least one example of the present disclosure.

FIG. 4A is a diagram 400 of the modular replaceable slip joint intercostal 100 of FIG. 1 installed atop two seat tracks 410, 420 of a vehicle, in accordance with at least one example of the present disclosure. In this figure, the intercostal 100 is shown to be mounted onto two seat tracks 410, 420 as well as a supporting track 430. In addition, the figure shows each seat track 410, 420 located above a respective longitudinal beam 415, 425.

As previously mentioned above, during installation of the intercostal 100, two slip joint openings (i.e. slip joints) 140, located proximate the first end 120 of the body 110, slidably receive a bushing 190 (refer to FIG. 1B) and a fastener (not shown). After the bushing 190 and the fastener 1000 (FIG. 8C) are inserted into the slip joint opening 140, the bushing 190 rigidly attaches to a top surface of seat track 410 by the fastener 1000.

In addition, during installation of the intercostal 100, two static openings 150, located proximate the second end 130 of the body 110, receive a fastener 1000 (FIG. 8C) (e.g., an E-Nut®). After the fastener 1000 is inserted into the static opening 150, the fastener 1000 rigidly attaches the intercostal 100 to a top surface of seat track 420.

Also during installation of the intercostal 100, the openings 165 of flanges 160 each receive a floor panel connector (e.g., a fastener), which is used to mount a floor panel(s) (not shown) to the top surface of the flange 160. After the intercostal 100 is installed, the top surface of each of the flanges 160 is substantially coplanar with the top surface of the seat tracks 410, 420.

In addition, during installation of the intercostal 100, the openings 180, 185 of the monument interfaces 170, 175 receive fasteners, which are used to mount various different structures or payloads 1001 (FIGS. 8A and 8B) (e.g., furniture, a class divider wall, a galley, lavatory, skins, interior panels, floor panels, and/or any other suitable equipment or structures) to the intercostal 100.

Additionally during installation of the intercostal 100, the optional static openings 188 may each receive a fastener 1000 (FIG. 8C) (e.g., an E-Nut®). After the fastener 1000 is inserted into the static opening 188, the fastener 1000 rigidly attaches the intercostal 100 to a top surface of supporting track 430, which is substantially parallel to seat track 410 and to seat track 420.

Figure 4B:
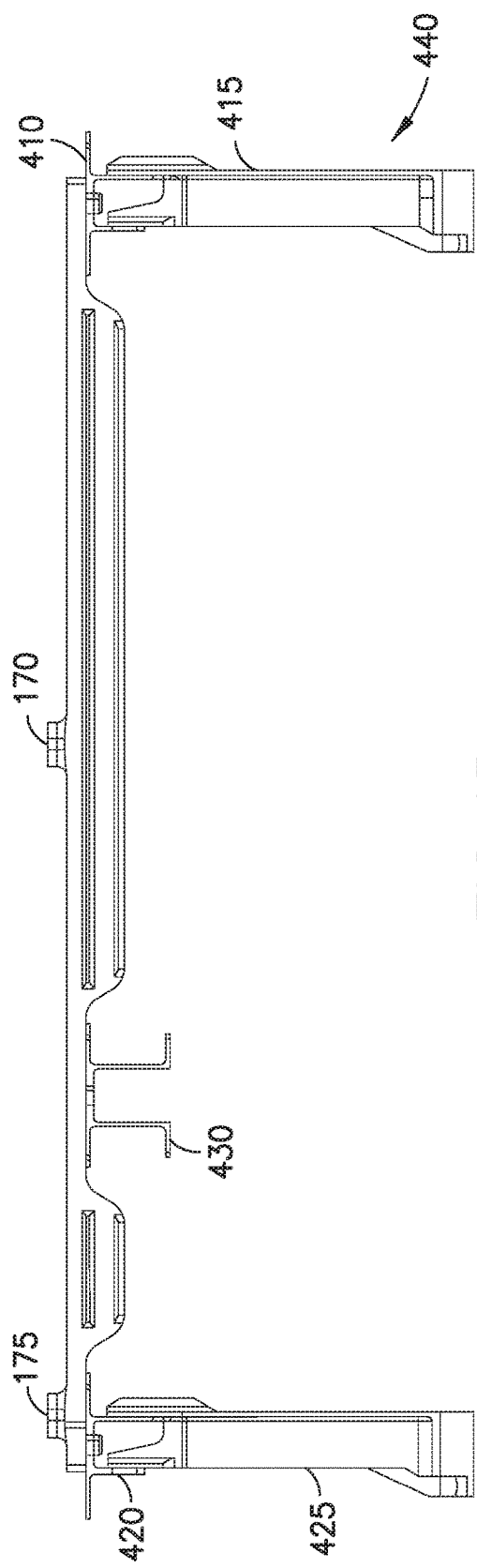
FIG. 4B is side view of the diagram of FIG. 4A, in accordance with at least one example of the present disclosure.
Figure 4C:
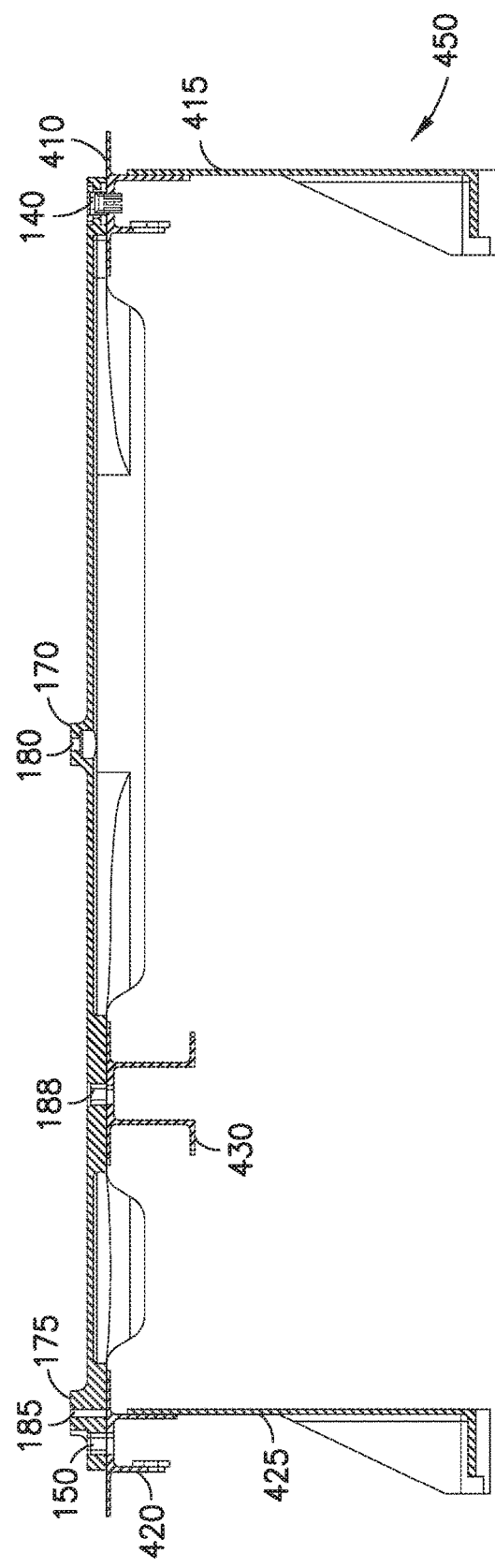
FIG. 4C is cut-away view of the side view of FIG. 4B, in accordance with at least one example of the present disclosure.

FIG. 4B is side view 440 of the diagram of FIG. 4A, in accordance with at least one example of the present disclosure. FIG. 4C is cut-away view 450 of the side view 440 of FIG. 4B, in accordance with at least one example of the present disclosure.

Figure 5:
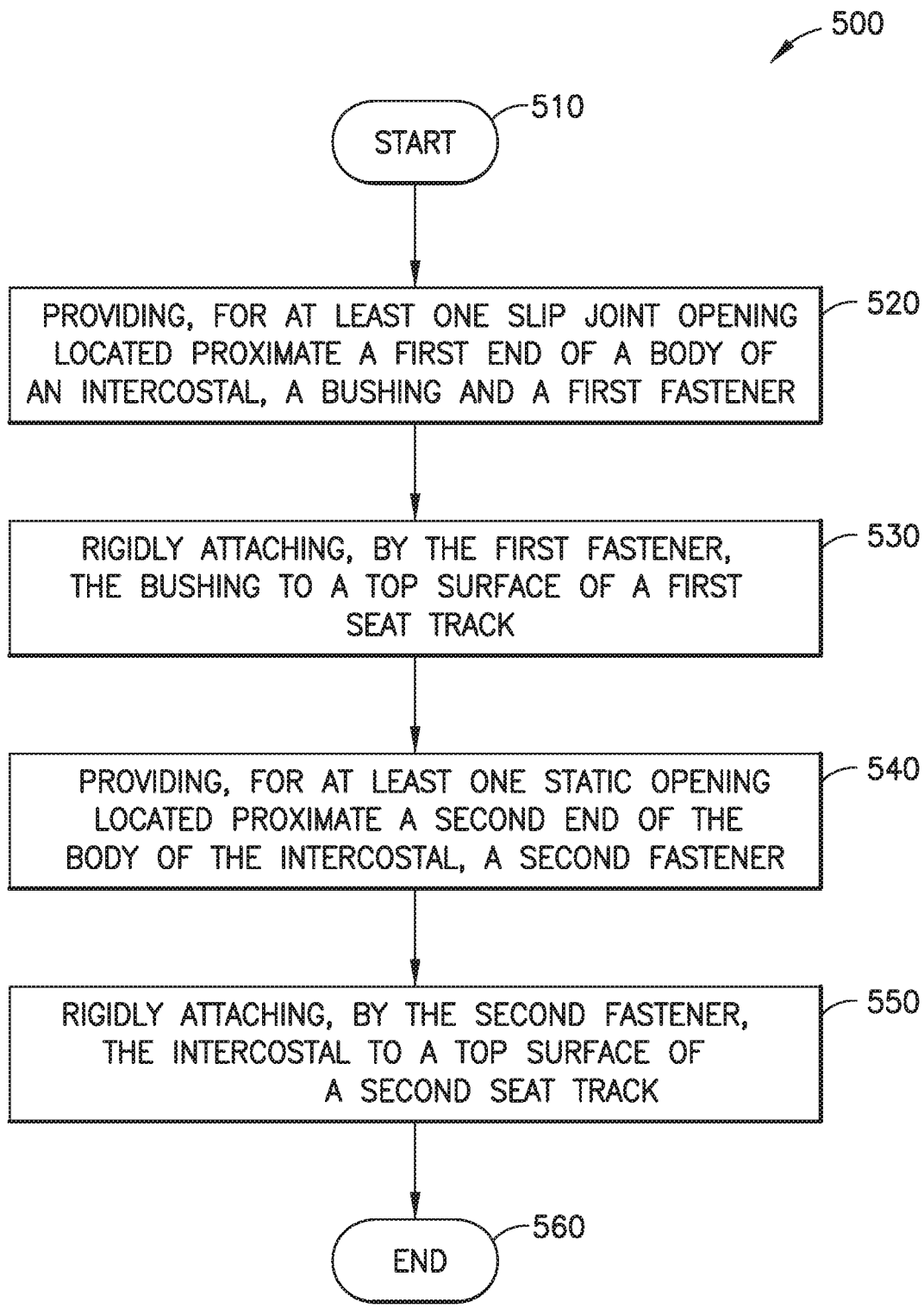
FIG. 5 is a flow chart for the disclosed method for installing an intercostal in a vehicle, in accordance with at least one example of the present disclosure.

FIG. 5 is a flow chart for the disclosed method 500 for installing an intercostal 100, 200 in a vehicle, in accordance with at least one example of the present disclosure. At the start 510 of the method 500, a bushing 190 and a first fastener 1000 (FIG. 8C) are provided for at least one slip joint opening located proximate a first end of a body of the intercostal 520. Then, the first fastener 1000 rigidly attaches the bushing 190 to a top surface of a first seat track 530. A second fastener 1000 is provided for at least one static opening 150 located proximate a second end of the body of the intercostal 540. The second fastener 1000 then rigidly attaches the intercostal 100 to a top surface of a second seat track 550. Then, the method 500 ends 560.

Figure 6:
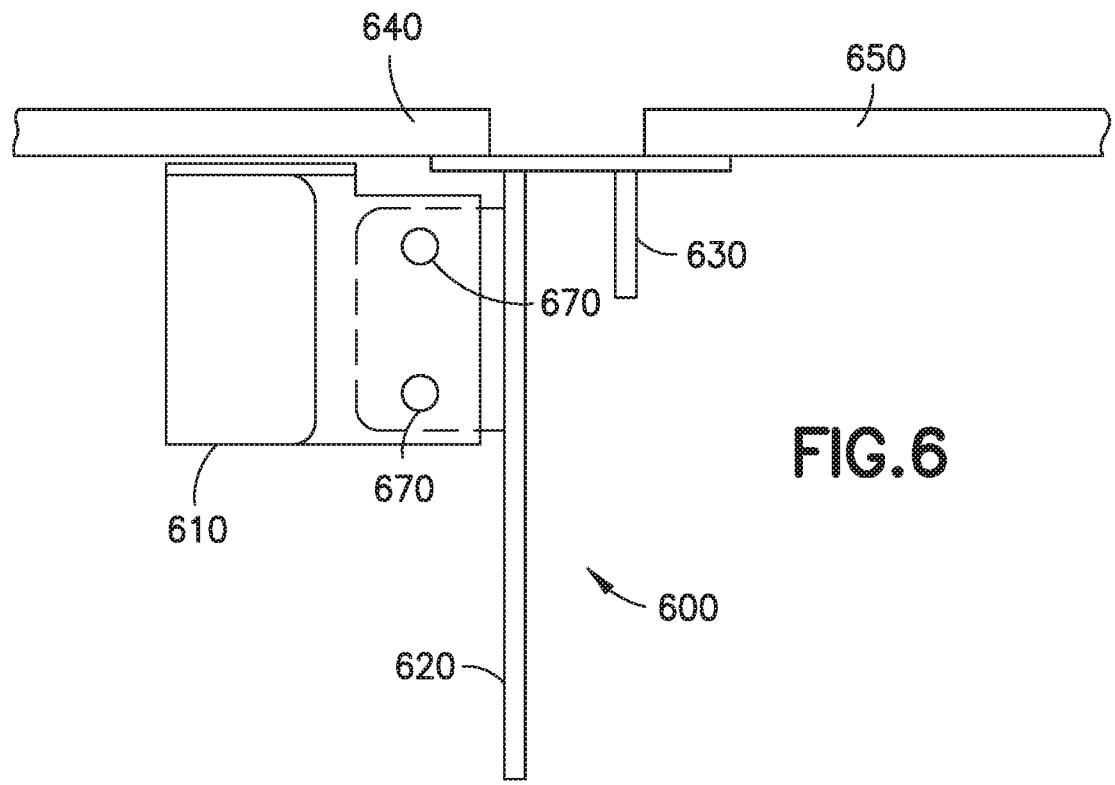
FIG. 6 is a diagram showing a cut-away side view of a conventional intercostal installed in a vehicle.

FIG. 6 is a diagram 600 showing a cut-away side view of a conventional intercostal 610 installed in a vehicle. In this figure, a conventional intercostal 610 is shown to be mounted onto a longitudinal beam 620. The conventional intercostal 610 is rigidly attached to the longitudinal beam 620 by fasteners 670.

The conventional intercostal 610 is also shown to be installed underneath a seat track 630 and a floor panel 640. The seat track 630 is shown to be located beneath two floor panels 640, 650. With this conventional intercostal design, installation work must occur below the surface of the floor panels 640, 650 and the web portion of the longitudinal beam 620 must be modified to accommodate the conventional intercostal. Moreover, this area is extremely tight to work in and, in many cases, it is difficult or impossible to install the conventional intercostal 610 (e.g., to fit the necessary tools, etc.) in this space without temporarily, or permanently, removing or modifying local systems and associated structures (e.g., adjacent floor panels 640, 650).

Figure 7:
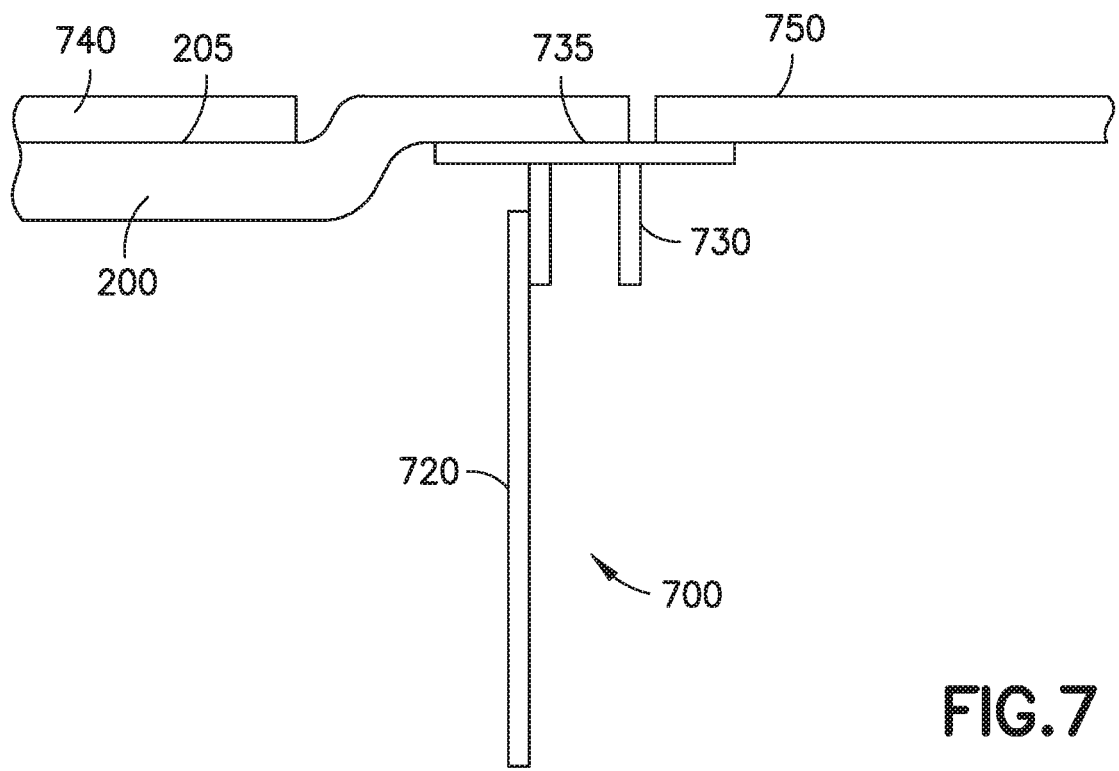
FIG. 7 is a diagram depicting a cut-away side view of the disclosed modular replaceable slip joint intercostal of FIG. 2 installed in a vehicle, in accordance with at least one example of the present disclosure.

FIG. 7 is a diagram 700 depicting a cut-away side view of the disclosed modular replaceable slip joint intercostal 200 of FIG. 2 installed in a vehicle, in accordance with at least one example of the present disclosure. In this figure, an intercostal 200 is shown to be mounted atop seat track 730, which is connected to a longitudinal beam 720. The intercostal 200 is rigidly attached to the seat track 730 by fasteners and, optionally, bushings. It should be noted that the top surface of the center section 205 of the intercostal 200 is substantially at the same height as the top surface 735 of the seat track 730 to mimic a flat-topped seat track interface.

The intercostal 200 is shown to be installed underneath a floor panel 740. And, the seat track 730 is shown to be located beneath a floor panel 750. With this disclosed design, installation work may occur above (i.e. no tooling is required from below) the surface of the floor panels 740, 750 because of the multi-planar design of the intercostal 200. This is very beneficial because local systems, adjacent floor panels 740, 750, and/or structures (e.g., seats) mounted above the floor panels 740, 750 do not need to be removed for the installation process.

Figure 8A:
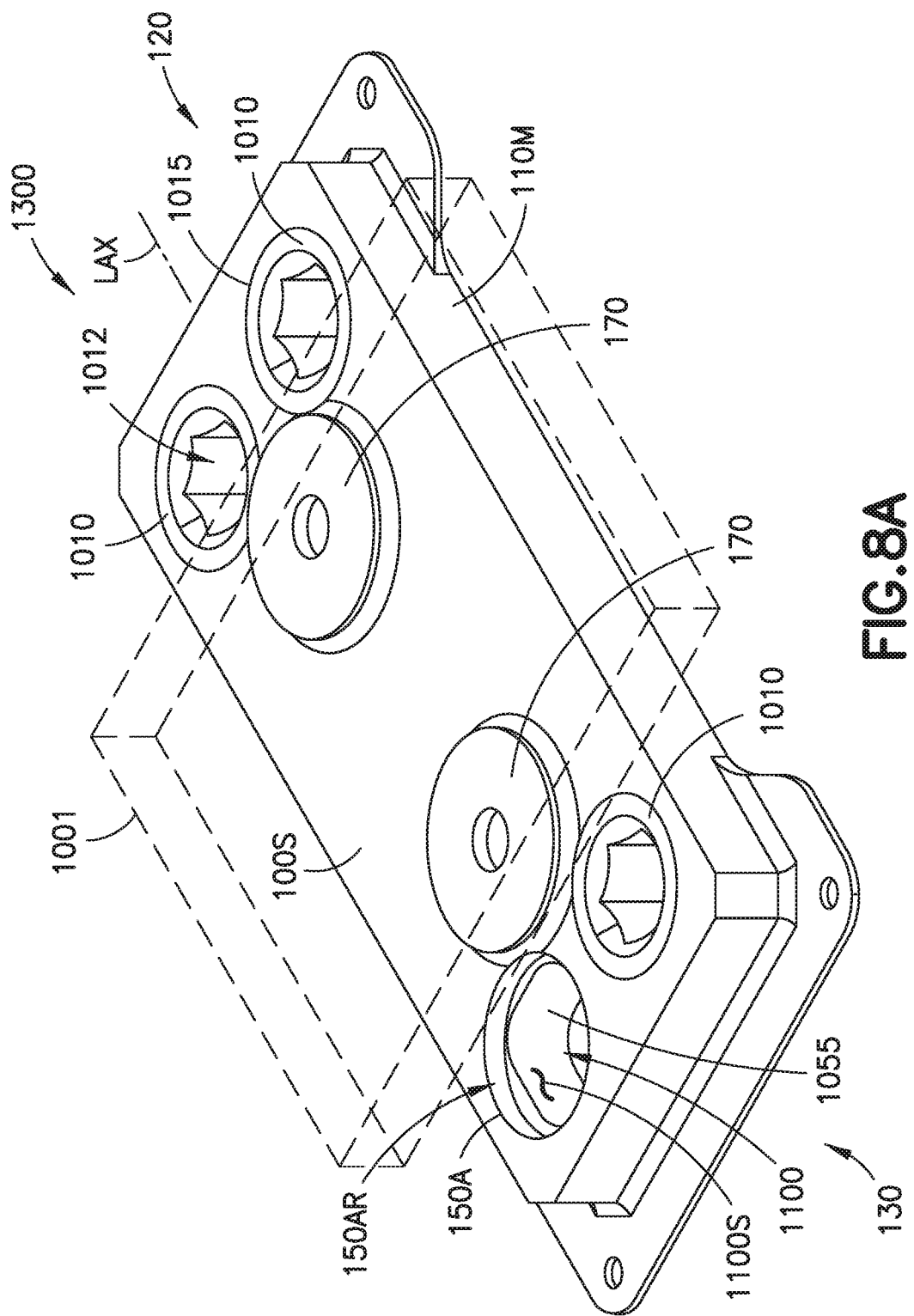
FIG. 8A is a diagram of a mounting member, in accordance with at least one example of the present disclosure.
Figure 8C:
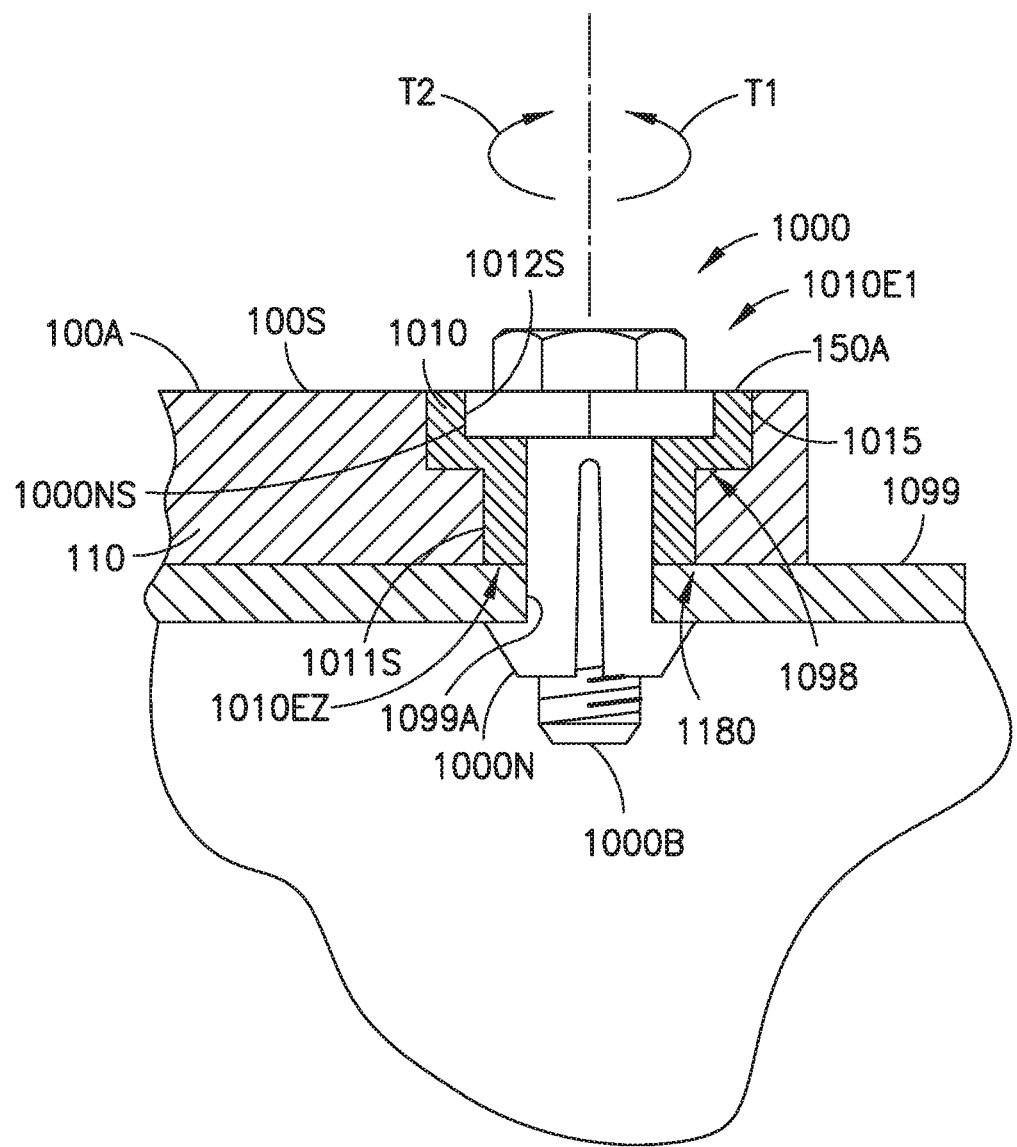
FIG. 8C is a schematic cross-sectional view of a portion of the mounting member of FIGS. 8A, in accordance with at least one example of the present disclosure.

Referring to FIG. 8A, a mounting member 1300 is illustrated in accordance with one or more aspects of the present disclosure. The mounting member 1300 may have any suitable shape and size configured to serve as a coupling between, for example, a frame 1099 (FIG. 8C) of the vehicle and any suitable structure such as the various different structures or payloads 1001 (FIGS. 8A and 8B) (e.g., furniture, a class divider wall, a galley, lavatory, skins, interior panels, floor panels, and/or any other suitable equipment or structures). The mounting member 1300 includes a mounting-member body 110M, a first end 120 of the mounting-member body 110M, and a second end 130 of the mounting-member body 110M. The second end 130 is located opposite from and is longitudinally spaced from the first end 120. The mounting-member body 110M is shown to be greater in length than in width so that a longitudinal axis LAX of the mounting-member body 110M extends between the first end 120 and the second end 130. In other aspects, the mounting-member body 110M may be greater in width than in length or have a cylindrical or any other suitable shape. In this aspect, both the first end 120 and the second end 130 each have at least one static opening 150A adjacent thereto and extending through the body 110 transverse to the longitudinal axis LAX. The at least one static opening 150A is configured to accept a respective one of at least one bushing 1010. The bushing 1010 is configured for insertion into a respective one of the at least one static opening 150A. The bushing 1010 may be a blind-fastener bushing having an aperture or blind-fastener receptacle 1012 configured to accept the fastener 1000, such as any suitable blind fastener including bolts and E-Nuts®.

Referring to FIG. 8B, a mounting member 1300 is illustrated in the form of an intercostal in accordance with one or more aspects of the present disclosure. In other aspects, the mounting member 1300 may have the form of any suitable fitting, beam, chord, panel, intercostal, longeron, stanchion, bracket, plate or any other suitable structure that includes a fastener joint that may deform under an applied fastener torque, e.g., where the bushing 1010 provides a wear surface for the fastener and distributes the applied torque to the mounting member 1300. The intercostal 100A may be substantially similar to one or more of the intercostals 100, 200 described above and include one or more features thereof. For example, the intercostal 100A includes a body 110, a first end 120 of the body 110, and a second end 130 of the body 110. The second end 130 is located opposite from and is longitudinally spaced from the first end 120. The body 110 is shown to be greater in length than in width so that a longitudinal axis LAX of the body 110 extends between the first end 120 and the second end 130. In this aspect, both the first end 120 and the second end 130 each have at least one static opening 150A adjacent thereto and extending through the body 110 transverse to the longitudinal axis LAX. The at least one static opening 150A is configured to accept a respective one of at least one bushing 1010. The bushing 1010 is configured for insertion into a respective one of the at least one static opening 150A. The bushing 1010 may be a blind-fastener bushing having an aperture or blind-fastener receptacle 1012 configured to accept the fastener 1000, such as any suitable blind fastener including bolts and E-Nuts®.

Referring to FIGS. 8A, 8B, 8C, 9A, 9B, and 10A-10C the at least one bushing 1010 has a bushing body 1010B, with a first end 1010E1 and a second end 1010E2, and the blind-fastener receptacle 1012 extends axially through the bushing body 1010B along axis 1010X, where the axis 1010X extends between the first end 1010E1 and the second end 1010E2. The bushing body 1010B forms an outer peripheral surface 1011S, 1011AS that circumscribes the blind-fastener receptacle 1012. The respective one of the at least one static opening 150A has an inner peripheral surface 1100S, 1100AS that is complementary to and interlocks with the outer peripheral surface 1011S, 1011AS so that the bushing 1010 is rotationally fixed relative to the mounting-member body 110M and/or intercostal body 110 (which are collectively referred to herein as mounting-member body 110M).

The bushing body 1010B has a bushing-body cross-sectional shape 1011, 1011A that interlocks and couples with a static-opening cross-sectional shape 1100, 1100A of a respective one of the at least one static opening 150A so that rotation of the at least one blind-fastener bushing 1010 is constrained, by the respective static opening 150A, relative to the mounting-member body 110M and the static-opening cross-sectional shape 1100, 1100A is maintained (e.g., is not deformed or caused to become rounded) upon application of a blind-fastener installation torque T2 or blind-fastener removal torque T1 being applied to the blind-fastener receptacle 1012 by a respective blind fastener 1000. In one aspect, the static openings 150, 188 described above may be substantially similar to the static opening 150A such that the intercostals 100, 200 described above, include the at least one static opening 150A and bushing 1010. Here, substantially all sides or facets of the bushing-body cross-sectional shape 1011, 1011A engage with respective sides or facets of the static-opening cross-sectional shape 1100, 1100A (e.g., the inner peripheral surface 1100S, 1100AS is complementary to and interlocks with the outer peripheral surface 1011S, 1011AS) so that the bushing 1010 interlocks with and is constrained by the static opening 150A. As such, because there is substantially no relative movement between the bushing 1010 and the static opening 150A the friction reducing coatings noted above may be omitted from the bushings 1010 and static openings 150A. In one aspect, the bushing 1010 may be installed into a respective static opening 150A in any suitable manner such as with a wet install, dry install, press/interference fit, etc.

Referring to FIG. 8C, as noted above, in an effort to reduce cost and/or weight of a vehicle, a material of the mounting member 1300 may change such that the material may no longer be able to accommodate, for example, the blind-fastener installation torque T2 and/or the blind-fastener removal torque T1. Conventionally intercostals are generally made from titanium or other exotic hard lightweight material however, titanium and other exotic materials are very costly. The mounting member 1300, in accordance with aspects of the present disclosure, may be constructed of aluminum or other more inexpensive and softer material (e.g., the material hardness of the mounting member 1300 is less than a material hardness of a conventional titanium intercostal). In some instances, a torque applied to the blind fastener 1000 may cause deformation of the static openings (e.g., which may prevent installation or removal of the blind fastener 1000) if the blind fasteners 1000 were to directly interface with the mounting member 1300. To prevent deformation of the static openings 150A a respective bushing 1010 is inserted into the static opening 150A so that the blind fastener 1000 interfaces with the bushing 1010 rather than directly with the mounting member 1300.

Referring to FIGS. 8C, 9A, and 11, the bushings 1010 disclosed herein have a second material hardness 1170 that is harder/greater than a first material hardness 1169 of the mounting-member body 110M. For example, the mounting-member body 110M may be constructed of aluminum while the bushings 1010 may be constructed from titanium or other material whose hardness is greater than the material used to form the mounting-member body 110M. In accordance with one or more aspects of the present disclosure, the one or more of a substantially flat surface portion, a concave surface portion, and a convex surface portion of the outer peripheral surface 1011S, 1011AS of the bushing 1010 and the inner peripheral surface 1100S, 1100AS of the static opening 150A have one or more of a surface area or surface profile that substantially prevents deformation of the at least one static opening 150A by the at least one blind-fastener bushing 1010 upon application of the blind-fastener installation torque T2 or the blind-fastener removal torque T1 being applied to the blind-fastener receptacle by the respective blind fastener.

Figure 10A:
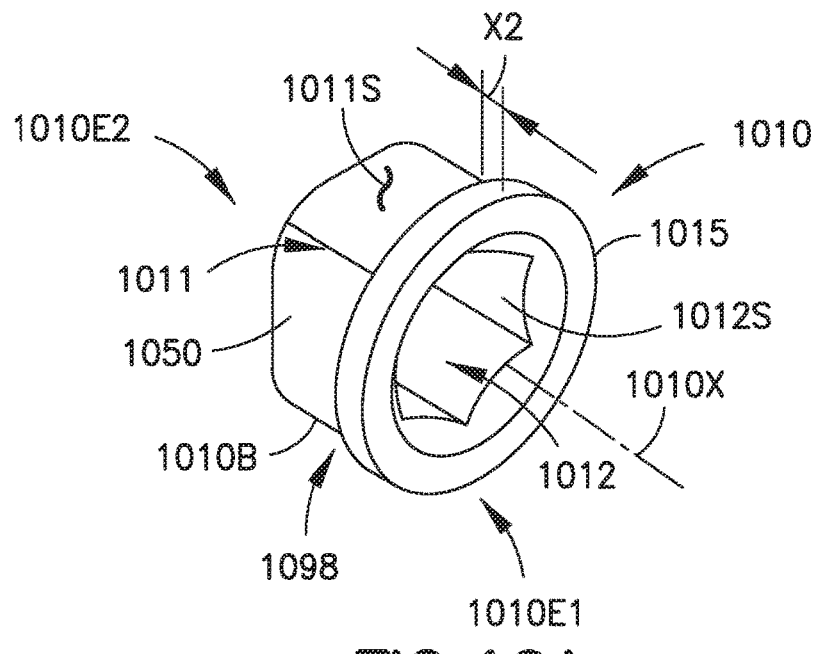
FIG. 10A is a perspective diagram of an exemplary bushing to be employed by the mounting member of FIG. 8A, in accordance with at least one example of the present disclosure.
Figure 10B:
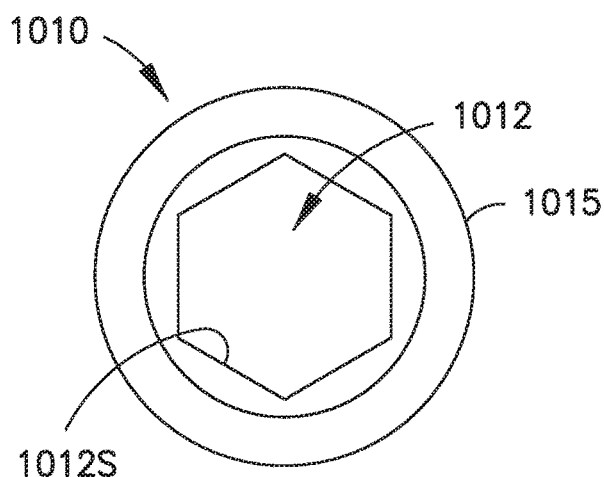
FIG. 10B is a top view of the exemplary bushing of FIG. 10A, in accordance with at least one example of the present disclosure.
Figure 10C:
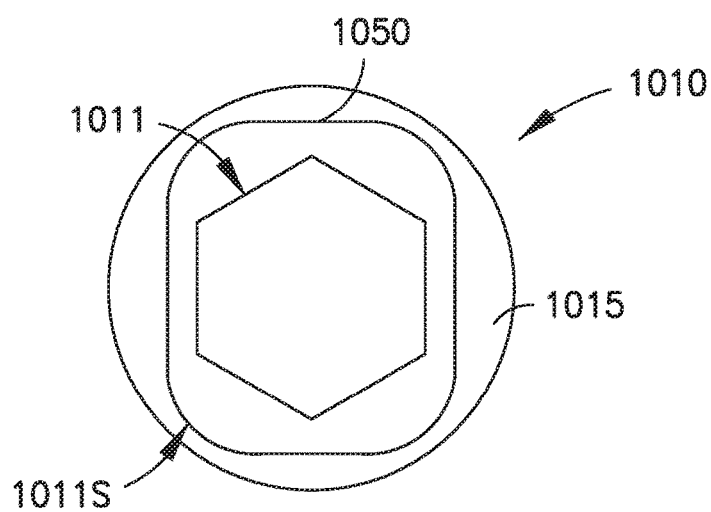
FIG. 10C is a bottom view of the exemplary bushing of FIG. 10A, in accordance with at least one example of the present disclosure.
Figure 13A:
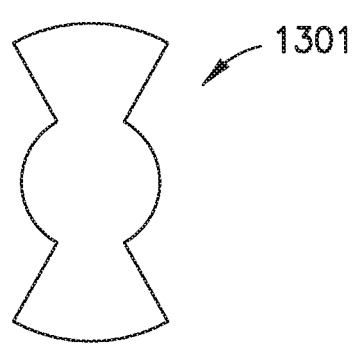
FIGS. 13A-13E are exemplary cross-sectional shapes of the exemplary bushings and static openings illustrated in FIGS. 8A, 8B, 9A, 10A-10C, 11, and 12A-12C, in accordance with at least one example of the present disclosure.
Figure 13B:
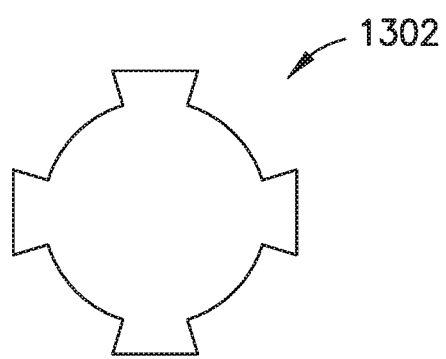
Figure 13C:
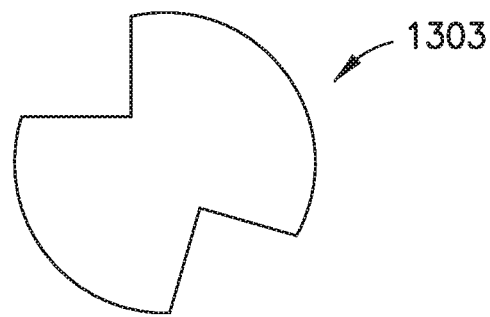
Figure 13D:
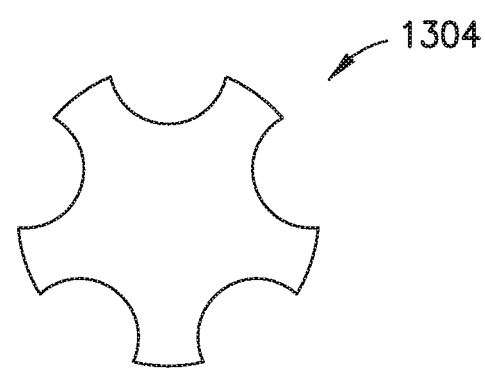
Figure 13E:
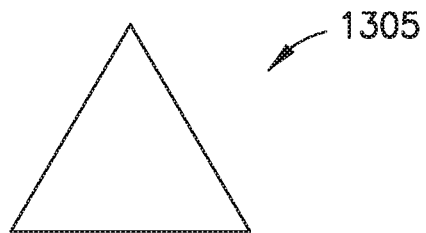

For example, referring to FIGS. 10A-10C and 12A-12C, the outer peripheral surface 1011S, 1011AS has at least one surface portion 1050 forming one or more of a substantially flat surface portion, a concave surface portion, and a convex surface portion. As can be seen in FIG. 10A the at least one surface portion 1050 forms at least the substantially flat surface portion and the convex surface portion where the outer peripheral surface 1011S has a substantially rectangular (or square) cross-section. FIG. 12A illustrates the at least one surface portion 1050 forming substantially flat surface portions where the outer peripheral surface 1011AS has a substantially hexagonal cross-section. Referring also to FIGS. 1B and 1C the two portions 195 of the body 194 of the bushing 190 are shown to be substantially cylindrical in shape; and, the two other portions 196 of the body 194 of the bushing 190 are shown to have a flat surface where an outer peripheral surface of the body 194 has a substantially ovoid cross-section. In other aspects, referring also to FIGS. 13A-13E, the outer peripheral surface of the bushing 1010 may have any suitable combination of substantially flat surface portions, concave surface portions, and convex surface portions so as to form any suitable shape, such as for example shapes 1301-1305, that are configured to interlock the bushing 1010 with the respective static opening 150A. As can be seen in FIGS. 10A, 12A, and 13A-13E the outer peripheral surface 1011S, 1011AS has a multifaceted cross-section.

Referring to FIGS. 9A and 11, the respective one of the at least one static opening 150A has an inner peripheral surface 1100S, 1100AS that is complementary to the outer peripheral surface 1011S, 1011AS so that the rotation of the at least one blind-fastener bushing 1010 is constrained relative to the mounting-member body 110M and the static-opening cross-sectional shape 1100, 100A is maintained upon application of the blind-fastener installation torque T2 or the blind-fastener removal torque T2. For example, the inner peripheral surface 1100S, 1100AS has at least one surface portion 1055 forming one or more of a substantially flat surface portion, a concave surface portion, and a convex surface portion. As can be seen in FIG. 9A the at least one surface portion 1055 forms at least the substantially flat surface portion and the concave surface portion where the inner peripheral surface 1100S has a substantially rectangular (or square) cross-section. FIG. 11 illustrates the at least one surface portion 1055 forming substantially flat surface portions where the inner peripheral surface 1100AS has a substantially hexagonal cross-section. Similarly, the inner peripheral surface of a respective static opening 150A configured to receive bushing 190 may have an inner peripheral surface that has a substantially ovoid cross-section that engages the substantially ovoid cross-section of the body 194 of bushing 190. In other aspects, referring also to FIGS. 13A-13E, the inner peripheral surface of the static opening 150A may have any suitable combination of substantially flat surface portions, concave surface portions, and convex surface portions so as to form any suitable shape, such as for example shapes 1301-1305, that are configured to interlock the bushing 1010 with the respective static opening 150A. As can be seen in FIGS. 9A, 11, and 13A-13E the inner peripheral surface 1100S, 1100AS has a multifaceted cross-section. The surface areas of the inner peripheral surface 1100S, 1100AS and the outer peripheral surface 1011S, 1011AS are such that the loads exerted on the inner peripheral surface 1100S, 1100AS of the static opening 150A by the outer peripheral surface 1011S, 1011AS of the bushing 1010 as a result of the blind-fastener installation torque T2 or the blind-fastener removal torque T1 is spread out or distributed over the inner peripheral surface 1100S, 1100AS of the static opening 150A to substantially prevent excessive wear and substantially prevent deformation of the mounting-member body 110M of the mounting member 1300.

Referring to FIGS. 8C, 9A, 9B, 10A, 11, and 12A the bushing 1010 includes a flange 1015 substantially similar to the flange 198 described above however, the flange 1015 need not have two portions 197 having a flat surface and may have any suitable shape and/or size. For example, the flange 1015 radially extends from the bushing body 1010B so as to extend past an interface 1180 between the respective one of at least one static opening 150A (e.g., the inner peripheral surface 1100S, 1100AS formed by the static-opening cross-sectional shape 1100, 1100A) and the outer peripheral surface 1011S, 1011AS of the body 1010B of the bushing 1010. The flange 1015 radially extends from the bushing body 1010B, adjacent the first end 1010E1 of the bushing body 1010B, so as to form a shoulder 1098 with the outer peripheral surface 1011S, 1011AS of the bushing body 1010B. In one aspect, at least one of the static openings 150A includes a recess 150AR formed in the mounting-member body 110M of the mounting member 1300. In one aspect, the recess 150AR has a depth X1 (see FIG. 9B) that is substantially equal to a thickness X2 of the flange 1015 of the bushing 1010. The recess 150AR has a shape and size that corresponds with the flange 1015 so that when the bushing is installed with the static opening 150A the first end 1010E1 of the bushing 1010 is substantially even (or flush) with the surface 100S of the mounting-member body 110M of the mounting member 1300. In other aspects, the mounting member 1300 may not have the recess(es) 150AR such that the flange 1015 of the bushing 1010 sits on the surface 100S of the mounting-member body 110M.

As can be seen best in FIG. 8C, each bushing 1010 attaches to a frame 1099 (such as the seat track 410 or other suitable structural feature, such as stringers, ribs, spars, longerons, bulkheads, landing gear components, engine components, fairings, skins, etc.) of the vehicle with the respective fastener 1000 extending through the blind-fastener receptacle 1012. The fastener 1000 illustrated in FIG. 8C is an E-Nut® for exemplary purposes only. As is known, an E-Nut® is a top down fastener that includes an expanding nut 1000N and a bolt 1000B. The expanding nut 1000N is inserted through the blind-fastener receptacle 1012 so as to extend past a second end 1010E2 of the bushing 1010 and through a corresponding aperture 1099A in the frame 1099. The bolt 1000B is inserted into the expanding nut 1000N so that tines of the expanding nut 1000N radially expand and engage a side of the frame 1099 opposite the mounting member 1300 and bushing 1010. The flange 1015 couples with the mounting-member body 110M so that the shoulder 1098 retains the mounting-member body 110M substantially against the frame 1099 of the vehicle where the mounting member 1300 is captured between the tines of the expanding nut 1000N (e.g., engaged with the opposite side of the frame 1099 as shown in FIG. 8C) and the flange 1015 of the bushing 1010.

The bushing 1010 is configured so as to prevent rotation of at least a portion of the fastener 1000 relative to the bushing 1010. For example, the blind-fastener receptacle 1012 has an inner peripheral surface 1012S configured to engage at least a portion of the respective blind fastener 1000, such as the expanding nut 1000N, so as to substantially prevent rotation of the expanding nut 1000N relative to the bushing 1010 body 1010B. In one aspect, the inner peripheral surface 1012S may extend along any suitable portion of the blind-fastener receptacle 1012 between the first end 1010E1 and the second end 1010E2 of the bushing 1010. In one aspect, the portion of the blind fastener, such as the expanding nut 1000N, has a shape and size 1000NS that interlocks with the inner peripheral surface 1012S of the blind-fastener receptacle 1012. For example, where the inner peripheral surface 1012S forms a hexagonal cross-section the shape and size 1000NS of the expanding nut 1000N may also have a hexagonal cross-section. It should be understood that while the expanding nut 1000N of the fastener 1000 is used as an example, in other aspects the fastener 1000 may have any suitable blind fastener configuration such that any suitable feature of the fastener interlocks with the bushing 1010 to rotationally fix at least a portion of the fastener 1000 for allowing installation of the fastener 1000 (and coupling of the bushing 1010 and intercostal 100A to the frame 1099).

Figure 14:
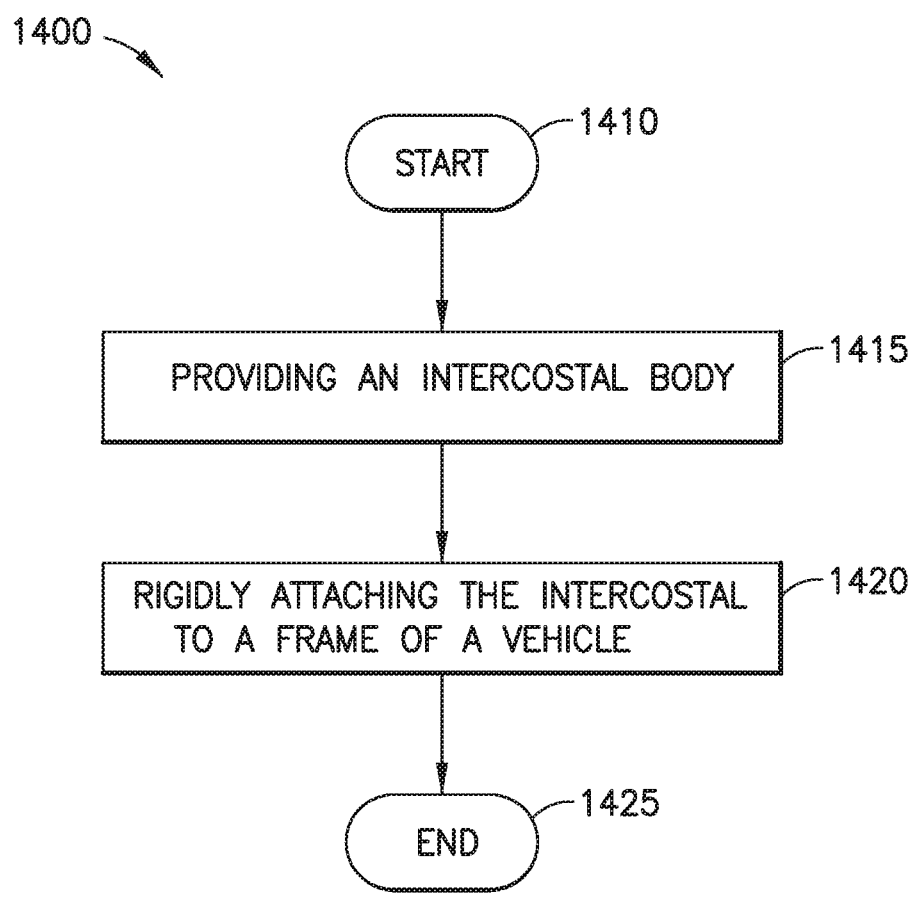
FIG. 14 is a flow chart for the disclosed method for installing a mounting member in a vehicle, in accordance with at least one example of the present disclosure.

Referring now to FIGS. 8B, 8C, and 14 an exemplary method 1400 for installing the mounting member 1300 in a vehicle will be described. At a start 1410 of the method 1400 a mounting-member body 110M is provided (FIG. 14, Block 1415) with at least one static opening 150A located adjacent each of a first end 120 and a second end 130 of the mounting-member body 110M. A bushing 1010 is inserted into at least one of the at least one static opening 150A, where the at least one static opening 150A has an inner peripheral surface 1100S, 1100AS (see FIGS. 9A and 11) that is complementary to and interlocks with an outer peripheral surface 1011S, 1011AS (see FIGS. 10A and 12A) of the bushing 1010 so that the bushing 1010 is rotationally fixed relative to the mounting-member body 110M. It is noted that the static opening 150A fixes the position of the respective bushing 1010 in substantially all degrees of freedom relative to the mounting-member body 110M of the mounting member 1300. The mounting-member body 110M is rigidly coupled to the frame 1099 of the vehicle with the fastener(s) 1000 extending through the blind-fastener receptacle (e.g., aperture) 1012 in the respective bushing 1010 (FIG. 14, Block 1420) after which all of the fasteners are inserted and tightened the method ends 1425.

Figure 15:
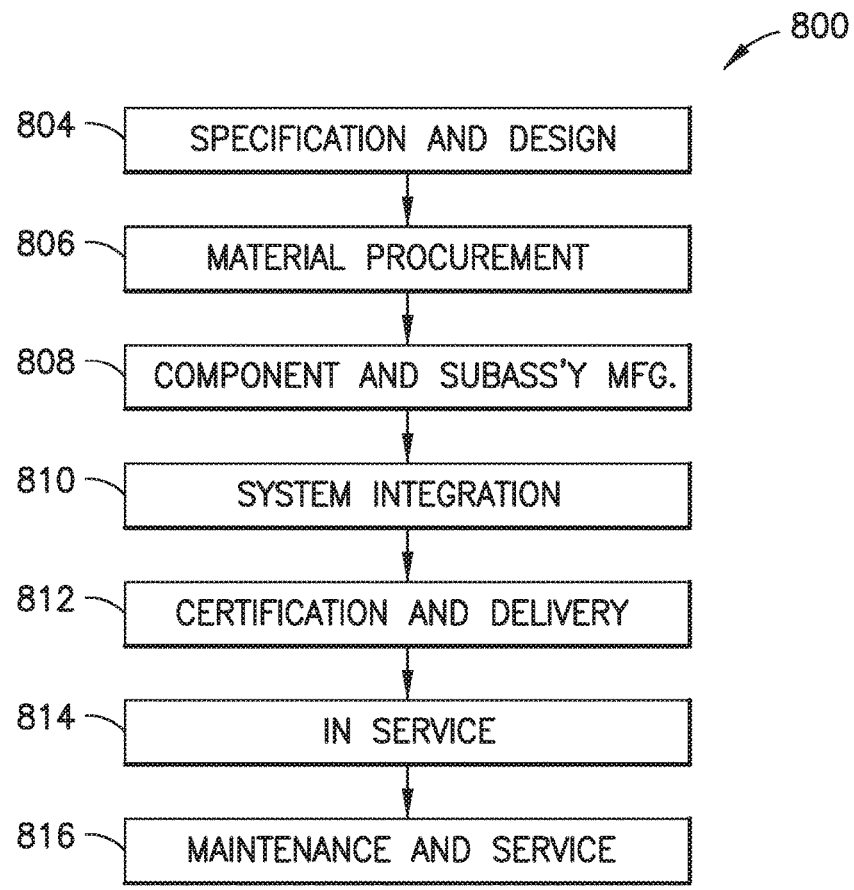
FIG. 15 is a flow diagram of aircraft production and service methodology, in accordance with at least one example of the present disclosure.
Figure 16:
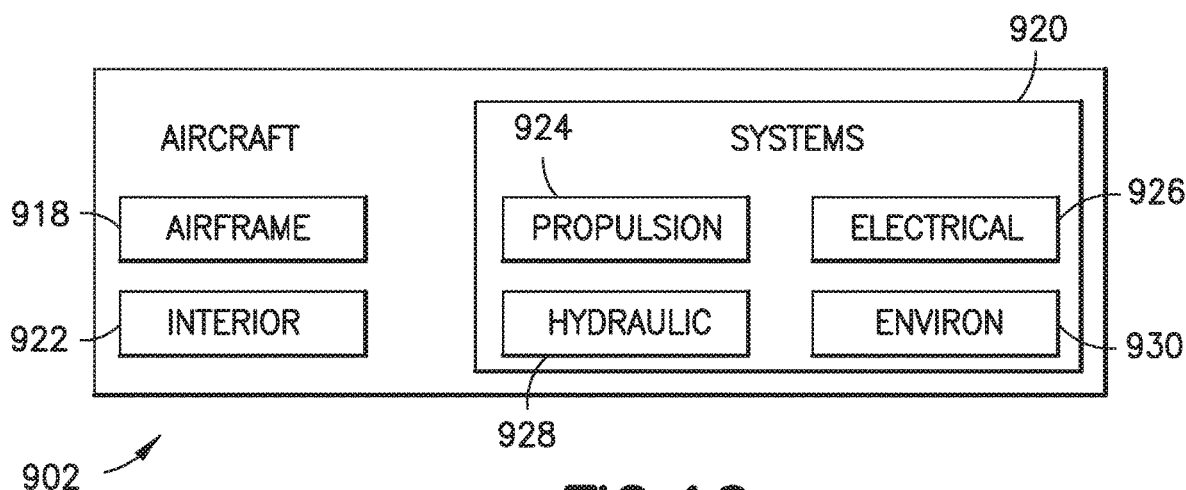
FIG. 16 is a block diagram of an aircraft, in accordance with at least one example of the present disclosure.

Examples of the disclosure may be described in the context of an aircraft manufacturing and service method 800 as shown in FIG. 15 and an aircraft 902 as shown in FIG. 16. During pre-production, exemplary method 800 may include specification and design 804 of the aircraft 902 and material procurement 806. During production, component and sub-assembly manufacturing 808 and system integration 810 of the aircraft take place. Thereafter, the aircraft 902 may go through certification and delivery 812 to be placed in service 814. While in service by a customer, the aircraft 902 is scheduled for routine maintenance and service 816 (which may also include modification, reconfiguration, refurbishment, and so on).

Each of the processes of the illustrative method 800 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 16, the aircraft 902 produced by the illustrative method 800 may include an airframe 918 with a plurality of high-level systems 920 and an interior 922. Examples of high-level systems 920 include one or more of a propulsion system 924, an electrical system 926, a hydraulic system 928, and an environmental system 930. Any number of other systems may be included. Although an aerospace example is shown, the principles of the disclosure may be applied to other industries, such as the automotive industry.

Apparatus and methods shown or described herein may be employed during any one or more of the stages of the manufacturing and service method 800. For example, components or subassemblies corresponding to component and subassembly manufacturing 808 may be fabricated or manufactured in a manner similar to components or subassemblies produced while the aircraft 902 is in service. Also, one or more aspects of the apparatus, method, or combination thereof may be utilized during the production states 808 and 810, for example, by substantially expediting assembly of or reducing the cost of an aircraft 902. Similarly, one or more of apparatus or method realizations, or a combination thereof, may be utilized, for example and without limitation, while the aircraft 902 is in service, e.g., maintenance and service 816.

It should be noted that the disclosed intercostal 100, 200 may be employed in cabins of other types of vehicles other than aircraft. In one or more examples, the disclosed intercostal may be employed in cabins of airborne vehicles (e.g., airplanes, space planes, and helicopters), terrestrial vehicles (e.g., trains, buses, and cars), and marine vehicles (e.g. boats and ships).

In the figures, referred to above, solid lines, if any, connecting various elements and/or components may represent mechanical, electrical, fluid, optical, electromagnetic, wireless and other couplings and/or combinations thereof. As used herein, the terms "coupled" and "attached" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 5, 14, and 15, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5, 14, and 15 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims may be presented for illustrative purposes only and are not intended to limit the scope of the claimed subject matter to the specific examples provided in the present disclosure.

What is claimed is:

1. A mounting member for a vehicle, the mounting member comprising:
    a mounting-member body, having a longitudinal axis;
    a static opening, extending through the mounting-member body transversely to the longitudinal axis; and
    a blind-fastener bushing, comprising a bushing body and a blind-fastener receptacle, extending axially through the bushing body,
    wherein:
        the blind-fastener receptacle is configured to receive a retainer of a blind fastener,
        the bushing body has a bushing-body cross-sectional shape that is complementary to a static-opening cross-sectional shape of the static opening,
        the bushing body interlocks with and is coupled to the static opening,
        the blind-fastener receptacle has a receptacle cross-sectional shape that is complementary to a cross-sectional shape of the retainer of the blind fastener, and
        the blind-fastener receptacle is configured to interlock with and to couple to the retainer of the blind fastener so that rotation of the blind-fastener bushing and of the retainer of the blind fastener is constrained relative to the mounting-member body and the static-opening cross-sectional shape is maintained when a blind-fastener installation torque or a blind-fastener removal torque is applied to the blind-fastener receptacle by the retainer of the blind fastener.

2. The mounting member of claim 1, wherein the blind-fastener bushing has a first material hardness that is greater than a second material hardness of the mounting-member body.

3. The mounting member of claim 1, wherein the blind-fastener receptacle has an inner peripheral surface configured to engage the retainer of the blind fastener so as to substantially prevent rotation of the retainer relative to the bushing body.

4. The mounting member of claim 1, wherein:
    the bushing body comprises an outer peripheral surface that circumscribes the blind-fastener receptacle, the outer peripheral surface having at least one surface portion forming one or more of a substantially flat surface portion, a concave surface portion, and a convex surface portion; and
    the static opening has an inner peripheral surface that is complementary to the outer peripheral surface so that the rotation of the blind-fastener bushing is constrained relative to the mounting-member body and the static-opening cross-sectional shape is maintained upon the blind-fastener installation torque or the blind-fastener removal torque being applied to the blind-fastener receptacle by the retainer of the blind fastener.

5. The mounting member of claim 4, wherein the one or more of the substantially flat surface portion, the concave surface portion, or the convex surface portion of the outer peripheral surface and the inner peripheral surface of the static opening have one or more of a surface area or a surface profile that substantially prevents deformation of the static opening by the blind-fastener bushing upon the blind-fastener installation torque or the blind-fastener removal torque being applied to the blind-fastener receptacle by the retainer of the blind fastener.

6. The mounting member of claim 4, wherein the blind-fastener bushing comprises a flange that radially extends from the bushing body so as to extend past an interface between the static opening and the outer peripheral surface.

7. The mounting member of claim 1, wherein the blind-fastener bushing comprises a flange that radially extends from the bushing body, adjacent a first end of the bushing body, so as to form a shoulder with an outer peripheral surface of the bushing body.

8. The mounting member of claim 7, wherein:
    the blind-fastener bushing is configured to be attached to a frame of the vehicle with the blind fastener extending through the blind-fastener receptacle; and
    the flange couples with the mounting-member body so that the shoulder retains the mounting-member body substantially against the frame of the vehicle.

9. A mounting member for a vehicle, the mounting member comprising:
    a mounting-member body, having a first end and a second end, which is longitudinally spaced from the first end;
    a static opening, extending through the mounting-member body, adjacent the first end of the mounting-member body and a second static opening, adjacent the second end of the mounting-member body; and
    a bushing, configured for insertion into one of the static opening and the second static opening,
    wherein:
        the bushing comprises a bushing body and an aperture that extends axially through the bushing body where the bushing body forms an outer peripheral surface that circumscribes the aperture,
        each of the static opening and the second static opening has an inner peripheral surface that is complementary to and interlocks with the outer peripheral surface of the bushing so that the bushing is rotationally fixed relative to the mounting-member body, and
        the aperture has an inner peripheral surface that is complementary to and is configured to interlock with a retainer of a blind fastener so that the inner peripheral surface is configured to rotationally fix the retainer relative to mounting-member body.

10. The mounting member of claim 9, wherein the inner peripheral surface of each of the static opening and the second static opening is complementary to and interlocks with the outer peripheral surface of the bushing so that a static-opening cross-sectional shape is maintained upon application of a fastener installation torque or a fastener removal torque to the bushing.

11. The mounting member of claim 9, wherein the bushing comprises a flange that radially extends from the bushing body so as to extend past an interface between the static opening and the outer peripheral surface.

12. The mounting member of claim 9, wherein the outer peripheral surface has a substantially rectangular cross-section, a substantially hexagonal cross-section, a substantially ovoid cross-section, or a multifaceted cross-section.

13. The mounting member of claim 9, wherein:
the outer peripheral surface has at least one surface portion that forms one or more of a substantially flat surface portion, a concave surface portion, or a convex surface portion; and
the inner peripheral surface of each of the static opening and the second static opening is complementary to the one or more of the substantially flat surface portion, the concave surface portion, or the convex surface portion of the outer peripheral surface.

14. The mounting member of claim 13, wherein the one or more of the substantially flat surface portion, the concave surface portion, and or the convex surface portion of the outer peripheral surface of the bushing, also the inner peripheral surface of each of the static opening and the second static opening, have one or more of a surface area or a surface profile that substantially prevents deformation of the static opening by the bushing upon a fastener installation torque or a fastener removal torque being applied to the aperture.

15. The mounting member of claim 9, wherein:
the bushing body comprises a first end, and
the bushing further comprises a flange that radially extends from the bushing body, adjacent the first end of the bushing body, so as to form a shoulder with the outer peripheral surface of the bushing body.

16. The mounting member of claim 15, wherein:
the bushing is configured to be attached to a frame of the vehicle with a fastener, extending through the aperture; and
the flange couples with the mounting-member body so that the shoulder retains the mounting-member body substantially against the frame of the vehicle.

17. The mounting member of claim 16, wherein the inner peripheral surface of the aperture is configured to engage at least a portion of the blind fastener so as to substantially prevent rotation of at least the portion of the blind fastener relative to the bushing body.

18. A method for installing a mounting member in a vehicle, the method comprising:
providing a mounting-member body, comprising a static opening, located adjacent each of a first end and a second end of the mounting-member body, wherein a bushing is inserted into the static opening, and wherein the static opening has an inner peripheral surface that is complementary to and interlocks with an outer peripheral surface of the bushing so that the bushing is rotationally fixed relative to the mounting-member body; and
rigidly coupling the mounting-member body to a frame of the vehicle with a blind fastener, extending through an aperture of the bushing, wherein the bushing has an inner peripheral surface that is complementary to and is configured to interlock with a retainer of the blind fastener so that the inner peripheral surface is configured to rotationally fix the retainer relative to the mounting-member body.

19. The method of claim 18, wherein:
the bushing comprises a bushing body and a flange, radially extending from the bushing body, and
the mounting-member body is retained substantially against the frame by the flange of the bushing.

20. The method of claim 18, further comprising applying a fastener installation torque or a fastener removal torque to the aperture with the blind fastener, wherein one or more of a substantially flat surface portion, a concave surface portion, or a convex surface portion of the outer peripheral surface of the bushing and also the inner peripheral surface of the static opening have one or more of a surface area or surface profile that substantially prevents deformation of the static opening by the bushing.

\* \* \* \* \*